(12) United States Patent
Narayanam et al.

(10) Patent No.: US 10,805,382 B2
(45) Date of Patent: Oct. 13, 2020

(54) RESOURCE POSITION PLANNING FOR DISTRIBUTED DEMAND SATISFACTION

(71) Applicant: International Business Machines Corporation, Armonk, NY (US)

(72) Inventors: Krishnasuri Narayanam, Bangalore (IN); Amith Singhee, Bangalore (IN); Sumanta Mukherjee, Bangalore (IN); Francisco Barahona, White Plains, NY (US); Joao P. M. Goncalves, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 15/882,404

(22) Filed: Jan. 29, 2018

(65) Prior Publication Data

US 2019/0238620 A1    Aug. 1, 2019

(51) Int. Cl.
*G06F 15/16* (2006.01)
*H04L 29/08* (2006.01)
(Continued)

(52) U.S. Cl.
CPC .......... *H04L 67/10* (2013.01); *H04L 41/0654* (2013.01); *H04L 41/0672* (2013.01);
(Continued)

(58) Field of Classification Search
CPC ....... H04L 67/10; H04L 67/18; H04L 67/325; H04L 41/08; H04L 47/82
See application file for complete search history.

(56) References Cited

U.S. PATENT DOCUMENTS

| 6,041,354 | A | 3/2000 | Biliris |
| 7,286,987 | B2 * | 10/2007 | Roy ........................ G10L 15/08 |
| | | | 704/270 |

(Continued)

OTHER PUBLICATIONS

Zhiguo Li et al., Spatio-Temporal Forecasting of Weather-Driven Damage in a Distribution System, 2015 IEEE Power & Energy Society General Meeting, Denver, CO, 2015, pp. 1-5.

(Continued)

*Primary Examiner* — Sm A Rahman
(74) *Attorney, Agent, or Firm* — Ryan, Mason & Lewis, LLP

(57) ABSTRACT

Methods, systems and computer program products for resource position planning are provided herein. A computer-implemented method includes generating a multi-commodity flow network for locations of a distributed service network over a planning horizon. The method also includes obtaining a set of candidate outage scenarios for the distributed service network, each of the set of candidate outage scenarios being associated with a corresponding probability of occurrence. The method also includes generating a resource positioning configuration for resources in the multi-commodity flow network utilizing an optimization model that reduces unmet demand for each of the set of candidate outage scenarios based at least in part on the probability of occurrence of each of the set of candidate outage scenarios. The method also includes providing the resource positioning configuration to the distributed service network to modify positioning of one or more resources in the distributed service network based on the generated resource positioning configuration.

20 Claims, 19 Drawing Sheets

(51) Int. Cl.
*H04L 12/24* (2006.01)
*H04L 12/911* (2013.01)

(52) U.S. Cl.
CPC .............. *H04L 41/08* (2013.01); *H04L 41/12* (2013.01); *H04L 41/145* (2013.01); *H04L 47/82* (2013.01); *H04L 67/18* (2013.01); *H04L 67/325* (2013.01)

(56) References Cited

U.S. PATENT DOCUMENTS

| | | | |
|---|---|---|---|
| 8,589,198 | B2 | 11/2013 | McMullin |
| 9,230,289 | B2 | 1/2016 | Omitaomu et al. |
| 9,792,568 | B2 | 10/2017 | Chen et al. |
| 10,410,155 | B2 | 9/2019 | Das |
| 2005/0096856 | A1 | 5/2005 | Lubkeman et al. |
| 2011/0029147 | A1 | 2/2011 | Sun |
| 2012/0265502 | A1 | 10/2012 | Omitaomu et al. |
| 2013/0051239 | A1 | 2/2013 | Meredith |
| 2014/0089449 | A1* | 3/2014 | Bhogal ............ H04L 67/06 709/213 |
| 2014/0129272 | A1 | 5/2014 | Hanley |
| 2014/0278654 | A1 | 9/2014 | Candas et al. |
| 2015/0088790 | A1 | 3/2015 | Chidlovskii et al. |
| 2015/0134384 | A1 | 5/2015 | Heinonen et al. |
| 2016/0306075 | A1 | 10/2016 | Heng et al. |
| 2016/0307127 | A1 | 10/2016 | Katz et al. |
| 2016/0313780 | A1 | 10/2016 | Stewart |
| 2016/0343093 | A1* | 11/2016 | Riland .................. G06Q 10/04 |
| 2017/0005515 | A1 | 1/2017 | Sanders |
| 2018/0143975 | A1 | 5/2018 | Casal |
| 2020/0134207 | A1* | 4/2020 | Doshi .................. H04L 9/0866 |

OTHER PUBLICATIONS

Kalbasi et al., MODE: Mix Driven On-line Resource Demand Estimation, 2011 7th International Conference on Network and Service Management, Paris, 2011, pp. 1-9.

Wang et al., A Bayesian Approach to Parameter Inference in Queueing Networks, ACM Transactions on Modeling and Computer Simulation, vol. 27, Issue 1, Nov. 2016, pp. 1-26.

List of IBM Patents or Applications Treated as Related.

Ali Arab et al., Proactive Recovery of Electric Power Assets for Resiliency Enhancement, IEEE Access, vol. 3, 2015, pp. 99-109.

S.J. Hood et al., Capacity Planning Under Demand Uncertainty for Semiconductor Manufacturing, IEEE Transactions on Semiconductor Manufacturing, vol. 16, Issue 2, May 2003, pp. 273-280.

* cited by examiner

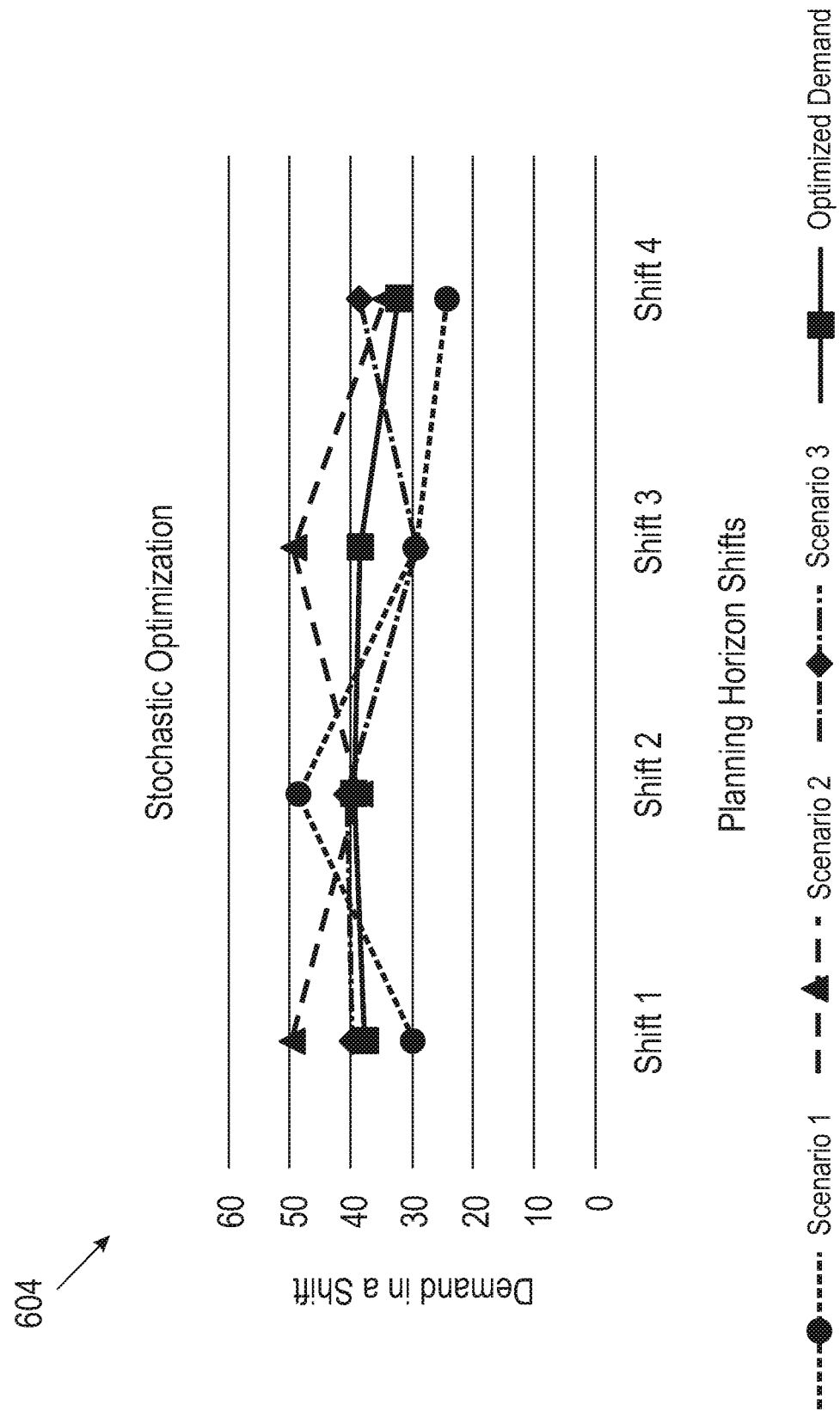

RESOURCE POSITION PLANNING FOR DISTRIBUTED DEMAND SATISFACTION

FIELD

The present invention relates to resources, and more specifically, to techniques for allocation and positioning of resources.

BACKGROUND

Distributed service networks, such as utilities, telecommunications networks, distributed computing infrastructure, etc. may include multiple geographic locations. Resources (e.g., assets, tools, crews or staff, etc.) may be distributed amongst the different geographic locations of a distributed service network. When there is an outage in a distributed service network, however, the distribution of resources among the different geographic locations of the distributed service network may not be ideal for responding to outages that may occur.

SUMMARY

Embodiments of the invention provide techniques for resource position planning.

In one embodiment, an exemplary computer-implemented method comprises steps of generating a multi-commodity flow network for a set of locations of a distributed service network over a planning horizon comprising one or more time intervals and obtaining a set of candidate outage scenarios for the distributed service network, each of the set of candidate outage scenarios being associated with a corresponding probability of occurrence. The method also comprises the step of generating a resource positioning configuration for resources in the multi-commodity flow network utilizing an optimization model that reduces unmet demand for each of the set of candidate outage scenarios based at least in part on the probability of occurrence of each of the set of candidate outage scenarios. The method also comprises the step of providing the resource positioning configuration to the distributed service network to modify positioning of one or more resources in the distributed service network based on the generated resource positioning configuration. The steps are carried out by at least one computing device.

In another embodiment, an exemplary computer-implemented method comprises steps of detecting occurrence of an event affecting a distributed service network comprising a set of locations and an initial resource positioning configuration of a plurality of resources at the set of locations, and identifying a set of a candidate outage scenarios for the distributed service network in response to the detected event, each of the set of candidate outage scenarios being associated with a corresponding probability of occurrence. The method also comprises the step of obtaining a resource positioning configuration for the plurality of resources in the distributed service network, the resource positioning configuration being generated utilizing an optimization model that reduces unmet demand for each of the set of candidate outage scenarios based at least in part on the probability of occurrence of each of the set of candidate outage scenarios. The method also comprises the step of modifying positioning of the plurality of resources among the set of locations in the distributed service network based on the obtained resource positioning configuration. The steps are carried out by at least one computing device.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 6A and 6B depict plots showing deterministic and stochastic optimization, according to an exemplary embodiment of the present invention.

DETAILED DESCRIPTION

Illustrative embodiments of the invention may be described herein in the context of illustrative methods, systems and devices for resource position planning. However, it is to be understood that embodiments of the invention are not limited to the illustrative methods, systems and devices but instead are more broadly applicable to other suitable methods, systems and devices.

Embodiments provide techniques for resource position planning in a distributed service network over a planning horizon. The distributed service network includes multiple locations, and the planning horizon includes multiple time periods, also referred to herein as shifts. The resource position planning seeks to find an optimal positioning of resources across the multiple locations for the planning horizon, given a set of multiple different outage scenarios. Each outage scenario may be associated with a probability, with an output resource position planning thus being weighted according to the probability of occurrence of the different input outage scenarios.

Figure 1:
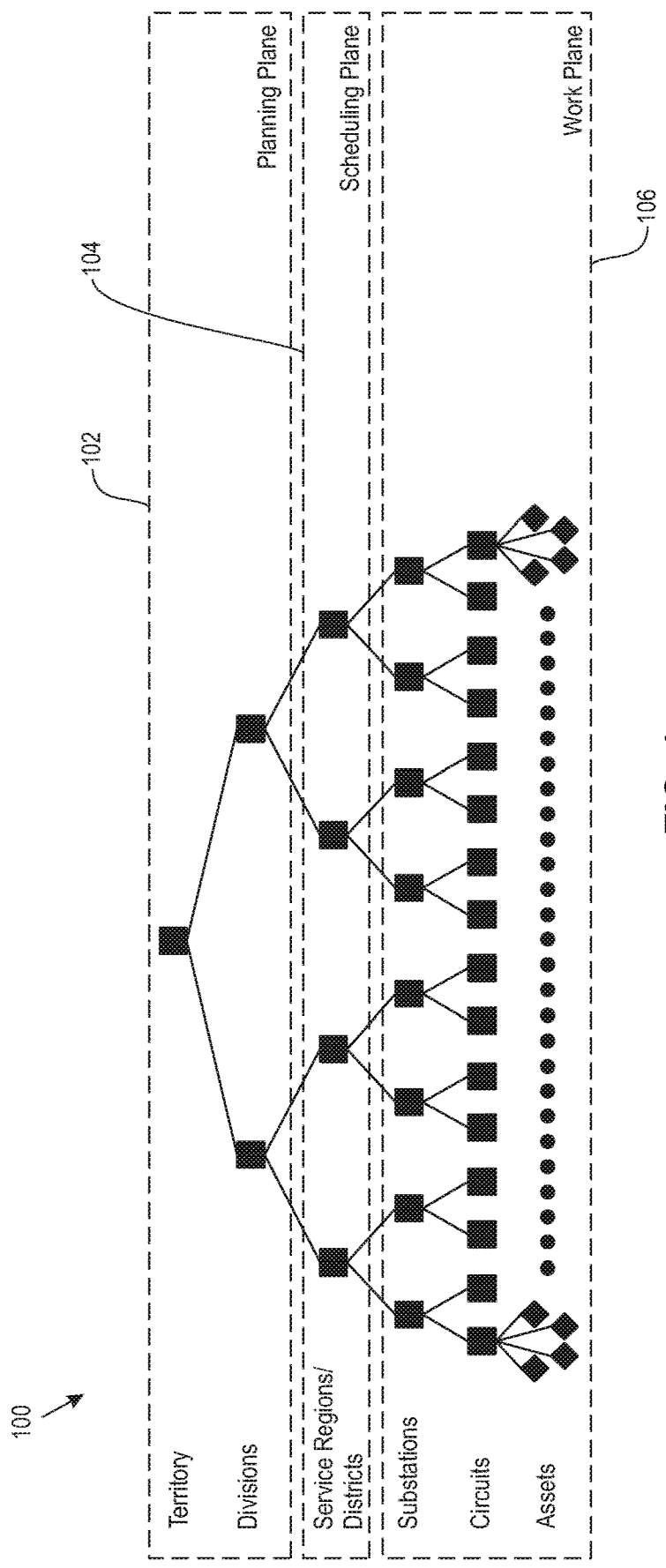
FIG. 1 depicts a utility system, according to an exemplary embodiment of the present invention.

The resource position planning in some embodiments seeks to optimize over the multiple different input outage scenarios, rather than optimizing for a single input outage scenario. Various embodiments are described below in the context of remediating or restoring outages in a distributed service network comprising a utility. FIG. 1, for example, depicts a utility system 100 organized into a planning plane 102, a scheduling plane 104 and a work plane 106. The planning plane 102 includes a territory and multiple divisions, and is configured to manage staffing levels across multiple service regions in the scheduling plane 104. The planning plane 102 is also configured to manage resource allocation across the service regions, as well as handling mutual aid and contractor decisions for resource allocation.

The scheduling plane 104 includes multiple service regions or districts, also referred to herein as service centers. The scheduling plane 104 is configured, within each of the service regions, to coordinate work order scheduling, job packet creation, job dispatch, job monitoring, etc. In some embodiments, the scheduling plane 104 may be implemented as an IBM® Maximo® Scheduler, part of the Maximo® Asset Management solution available from International Business Machines Corporation.

The work plane 106 includes, as part of the different service regions or districts, multiple substations, circuits, and assets. The work plane 106 is configured to coordinate maintenance and restoration activities for the utility 100, such as field crew enablement, operational support, etc. In some embodiments, the work plane 106 may be implemented as an IBM® Maximo® Anywhere solution part of the Maximo® Asset Management solution.

Functionality of the planning plane 102 will now be described with respect to a scenario involving a restoration work plan for the utility 100 created in response to a predicted natural disaster or other emergency event. The planning plane 102 may utilize a weather forecast, for example, to identify the characteristics, path, timing and severity of an incoming weather event. Utilizing the weather forecast, the planning plane 102 may perform damage and outage predictions, such as predicting damages and/or outages expected to occur in the different divisions, service regions, substations, etc. per day, shift or other unit of time, per damage type. Based on the damage and outage predictions, the planning plane 102 can generate resource demand predictions. The resource demand predictions may be used to determine how many tasks are expected to be needed in each division, service region, substation, etc. per task type per day, shift or other unit of time. The resource demand predictions may further comprise predictions of the distribution of task duration and travel times for moving or re-allocating resources from one division, service region, substation, etc. to another.

The planning plane 102, utilizing the damage and outage predictions as well as the resource demand predictions, generates one or more resource positioning configurations. The resource positioning configurations, in some embodiments, are designed to optimize: (i) staffing levels across multiple service centers to meet expected and outstanding resource demands; (ii) resource reallocation across service centers; (iii) mutual aid and contractor decisions; etc. The planning plane 102 in some embodiments is configured to generate the resource positioning configurations to provide real-time planning in emergencies, to provide stochastic resource deployment policies, taking into account forecast and realized demand with priorities, etc.

Figure 2:
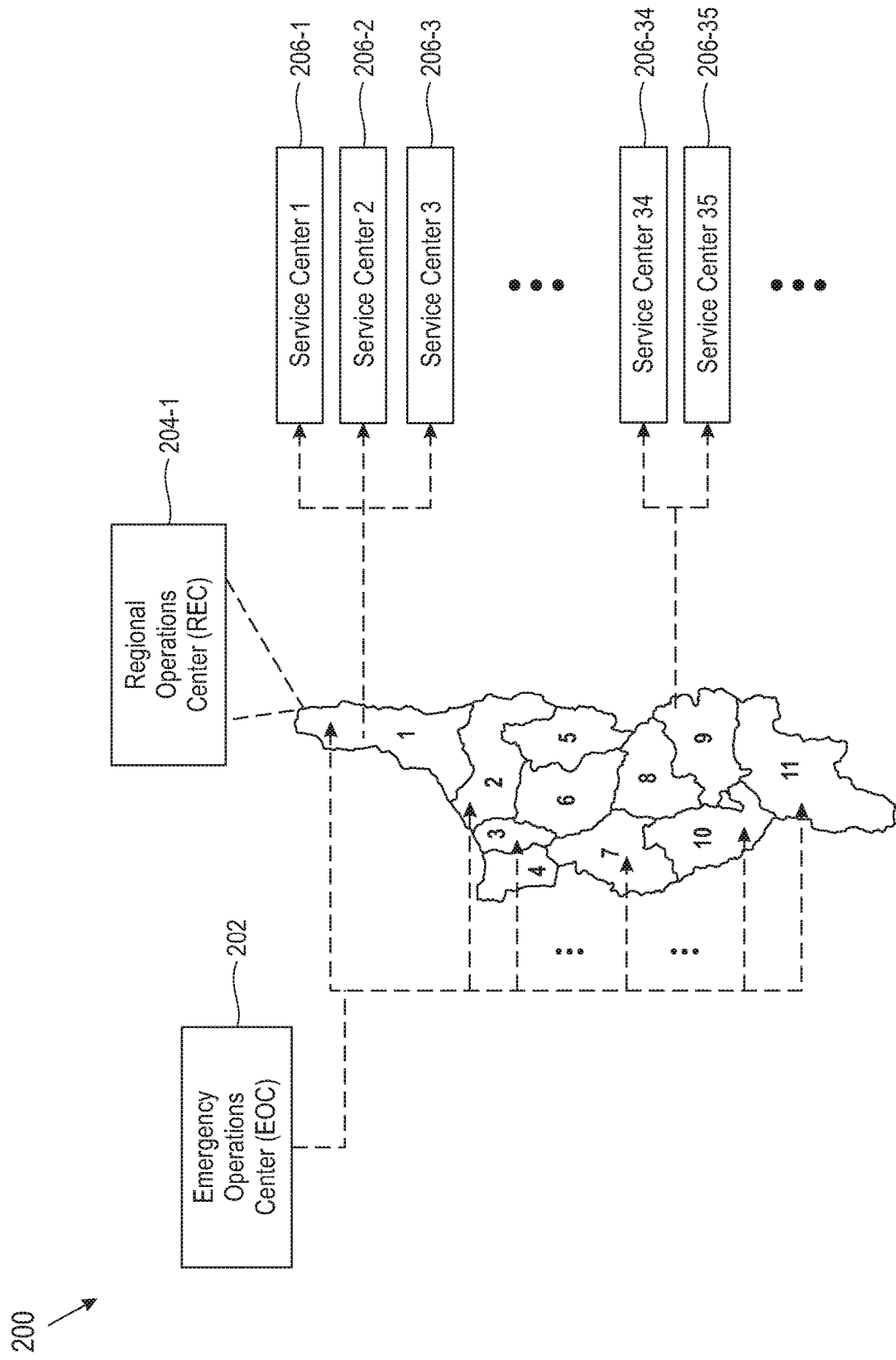
FIG. 2 depicts a detailed view of a utility system, according to an exemplary embodiment of the present invention.

FIG. 2 depicts a detailed view of a utility 200. The utility 200 includes an emergency operations center (EOC) 202, which provides coordination across divisions denoted 1 through 11 in the map. Each of the divisions may include a corresponding regional operations center (REC) 204. For example, the division 1 is shown as including REC 204-1. It is to be appreciated, however, that a utility or other distributed system need not include an intermediate layer of RECs. Each of the divisions is divided into a number of service centers 206 (e.g., one service center per service region). For example, the division 1 includes service centers 206-1, 206-2 and 206-3, while the division 9 includes service centers 206-34 and 206-35. The EOC 202 and RECs 204 may be considered as part of the planning plane 102, while the service centers 206 may be considered as part of the scheduling plane 104.

The planning plane 102/EOC 202 is configured to provide an output, such as optimal crew staffing levels across different service centers or RECs 204 for one or more future units of time or epochs (e.g., for a next day, for a next few days). The optimal crew staffing levels may be generated by shift (e.g., 8 hours, 16 hours, one day, etc.) or other designated unit of time. The output of the planning plane 102/EOC 202 may further indicate whether resources should be moved across different service centers or RECs 204 and, if so, how resources should be moved. The output of the planning plane 102/EOC 202 may also indicate whether mutual aid agreements should be invoked, or whether contractors (or resources thereof) should be hired to handle demand. The output of the planning plane 102/EOC 202 may also indicate an impact of carves, as will be described in further detail below.

To generate its output, the planning plane 102/EOC 202 may utilize various inputs, such as a work demand (e.g., an outage prediction, actual outages, stochastics if available, etc.) and supply factors (e.g., initial crew or other resource availability, crew or other resource performance, etc.). Various constraints may also be part of the input, or otherwise provided to the planning plane 102/EOC 202. Examples of constraints include the availability of crews or other resources, business and transport-related constraints, etc. A more detailed discussion of constraints will be provided below. The objective of the planning plane 102/EOC 202 is to generate optimal allocations of resources, so as to minimize restoration time, maximize customers restored, minimize cost, etc.

In some embodiments, the scheduling problem of creating job packets is solved within each of the service centers as a separate task. Such job scheduling may be considered as a downstream process relative to the resource allocation problem solved by the planning plane 102/EOC 202. Various techniques may be used to generate job schedules given a resource pool. Embodiments, however, focus on generating resource positioning configurations to handle resource requirements across locations and across time, given work demand, where the work demand has not yet been scheduled optimally.

Figure 3:
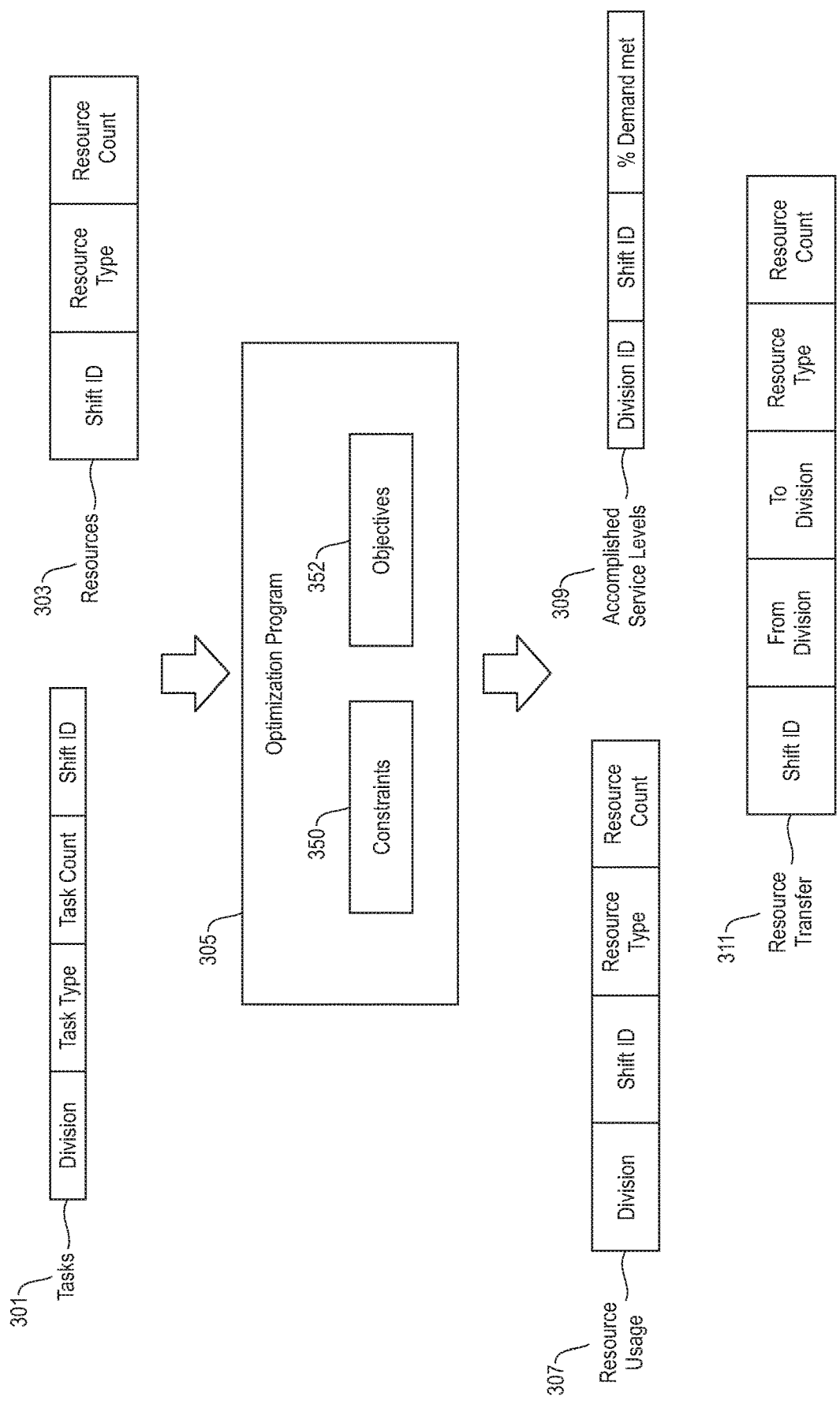
FIG. 3 depicts a resource positioning model, according to an exemplary embodiment of the present invention.

FIG. 3 shows a resource positioning model 300. The resource positioning model 300 includes an optimization program 305, which takes as input information associated with tasks 301 and resources 303. The tasks 301 comprise information regarding the division, task type, task count and shift ID for the tasks. The resources 303 comprise information such as shift ID, resource type and resource count for the different resources. Although not shown, configuration parameters such as a plan start time, operational period, shift length and estimated time of restoration (ETOR), etc. may also be input to the optimization program 305.

The optimization program 305 includes constraints 350 and objectives 352. The constraints 350 may include various types of constraints such as minimum staffing requirements, work shift length, public safety tasks that should precede repair tasks, trouble-to-crew type mappings, constraints such as using mutual aid only after regular and contractor resources are consumed, etc. The objectives 352 may include maximizing a number of tasks restored, minimizing the unmet demand, minimizing task start delay, minimizing length of outages, minimizing crew movement, etc.

Outputs of the optimization program 305 include information associated with resource usage or positioning 307, accomplished service levels 309 and resource transfers 311. Resource usage or positioning 307 information comprises information regarding the division, shift ID, resource type and resource count for positioned resources. Accomplished service levels 309 includes information regarding the division ID, shift ID and percentage of demand met by the positioned resources. Resource transfer information 311 includes information regarding shift ID, the source or "from" division, the destination or "to" division, resource type and resource count for resources that are moved between different locations or service centers as part of the resource positioning configuration.

The resource positioning model 300 therefore takes system level new inputs, such as resource types at the granularity of the resource organizations (e.g., internal, contract, mutual-aid, etc.), resource deployment policies, demand with associated priorities (e.g., demand can be realized or predicted), division specific ETORs, etc. The resource positioning model 300 provides system level new outputs, such as resource positioning for each resource type at the granularity of the resource organizations, resource transfers for each resource type at the granularity of the resource organizations, etc.

Figure 4:
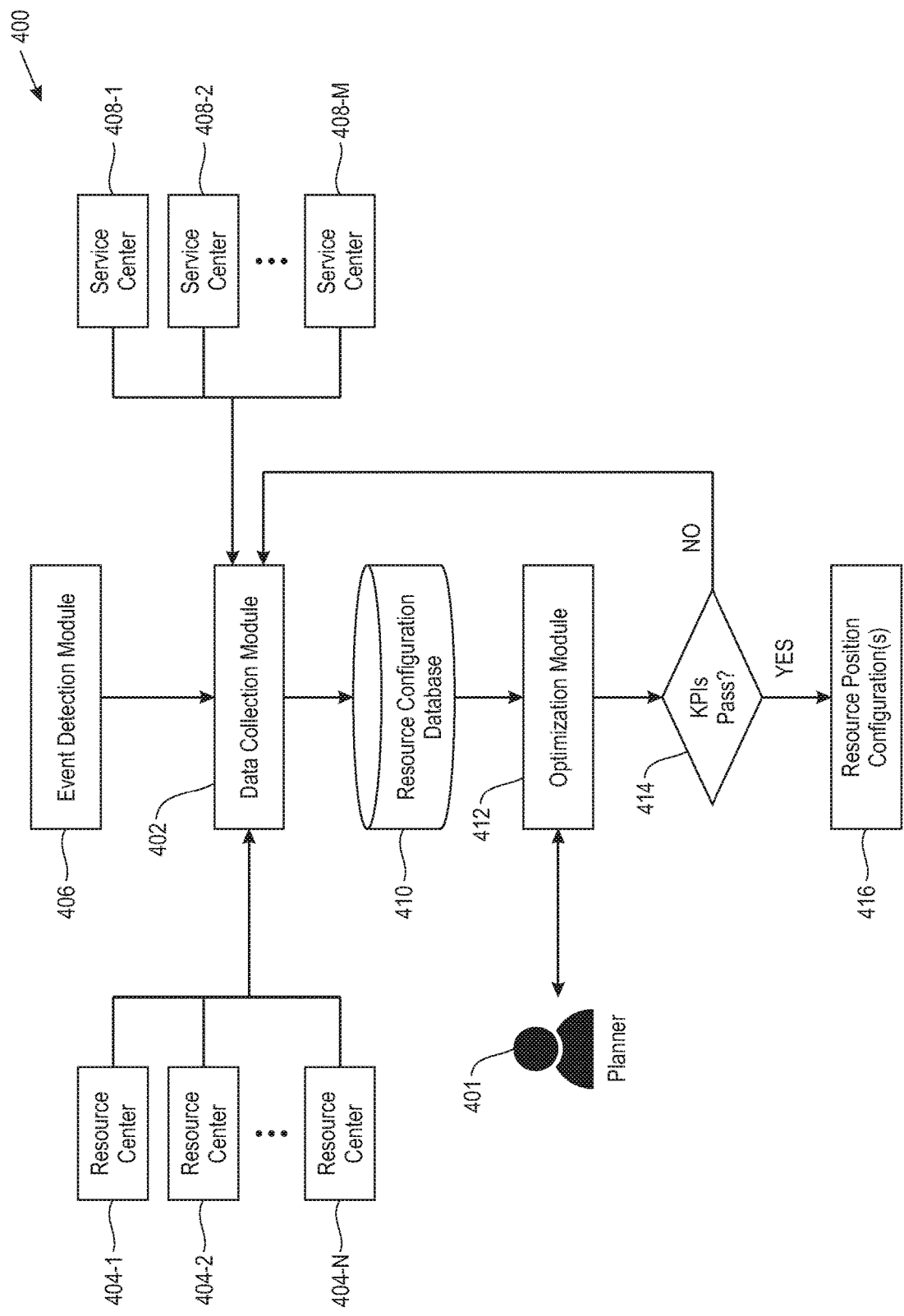
FIG. 4 depicts a system for generating resource positioning configurations, according to an exemplary embodiment of the present invention.

FIG. 4 depicts a system architecture and processing flow 400 for generating resource positioning configurations. An input or data collection module 402 is configured to gather information from various sources, such as resource centers 404-1, 404-2, . . . , 404-N (collectively, resource centers 404), an event detection module 406, and service centers 408-1, 408-2, . . . , 408-M (collectively, service centers 408). The resource centers 404 provide information to the data collection module 402 regarding resource availability, resource types, organization, etc. The event detection module 406 provides information regarding events that would cause a resource positioning configuration to change (e.g., stochastic outage scenarios) to the data collection module 402. For example, the event detection module 406 may represent a meteorologist or other source of weather information, a security operations center or other computer or network monitoring tool, etc. The service centers 408 provide information to the data collection module 402 regarding resource deployment policies at the respective service centers. The data collection module 402 stores the gathered information from resource centers 404, event detection module 406 and service centers 408 in a resource configuration database 410.

An optimization model 412 utilizes the information stored in the resource configuration database 410, possibly along with information from a planner 401, to generate potential resource positioning configurations. The information from the planner 401 may include, by way of example, configuration parameters, what-if analysis data, etc. In decision block 414, it is determined whether key performance indicators (KPIs) pass or are otherwise satisfied given the generated potential resource positioning configurations. The KPIs may be specified by the planner 401, by input from the resource centers 404, event detection module 406 or service centers 408, etc. If all the KPIs pass for a given potential resource positioning configuration, that potential resource positioning configuration is output as an optimal resource positioning configuration 416. If the all the KPIs do not pass for the potential resource positioning configurations, the process flow may revert back to the data collection module 402, to gather additional information from different stakeholders (e.g., resource centers 404, event detection module 406, service centers 408, etc.). In other embodiments, processing may revert to the optimization model 412, which may generate a notification or other query to the planner 401, seeking adjustment of configuration parameters or other input.

Embodiments provide systems and methods for robust resource position planning in real-time. Various embodiments are described herein with respect to performing an outage restoration of a utility (e.g., power, water, phone, cable, telecommunications, etc.), but it is to be appreciated that embodiments are not limited to resource position planning for utilities. In other embodiments, techniques described herein for resource position planning may be used more generally for distributed service networks, including but not limited to positioning of compute, storage and network resources (e.g., in data centers, virtual infrastructure, cloud networks, storage networks, etc.).

In some embodiments, resource position planning is performed in real-time, so as to perform utility outage restoration due to, or predicted from, uncertain damage scenarios from natural disasters or other service disruption events in distributed service delivery. Resource position planning utilizes an aggregated demand model for faster resource position planning. Resource positioning methods aggregate work from multiple tasks with the same type in each shift (or other time unit) at a location as the aggregate shift demand, and allocates resources to meet as much demand as possible. In some embodiments, resource position methods are formulated as a multi-commodity flow network to find the resource positioning at each node in real time.

Restoration order may be determined among buckets of demand, with priorities assigned to the buckets. Thus resource positioning methods partition demand in each shift into buckets with different priorities, with the order of resolving these different buckets of demand being configurable as detailed herein. A demand bucket may represent predicted demand, realized demand, or combinations thereof.

Different resources may be associated with different deployment policies. In some cases, resources belonging to different organizations or resources which are otherwise owned or associated with different individuals or entities may have different deployment policies. Resource positioning methods consider the possible different organizational associations of resources (e.g., internal, contractor, mutual aid, etc.) and the deployment priorities for resources that belong to these different resource organizations are taken into account by associating different costs with different resource deployment options (e.g., lower costs are associated with more desired resource deployment options, while higher costs are associated with less desired resource deployment options).

Resource positioning methods may consider spatio-temporal stochastic outage scenarios. Systems may consider a set of possible outage scenarios (with each outage scenario being a set of tasks for responding to or remediating the outages) along with the occurrence probability of each scenario, and perform stochastic optimization. Resource positioning plans output by the stochastic optimization method may not be the best suitable plan meeting an individual input scenario, but instead may be a balanced plan that meets demand with respect to multiple possible input (e.g., outage) scenarios.

Utilizing spatio-temporal stochastic outage scenarios, where a set of possible outage scenarios are considered, provides various advantages to planning for resource positioning at different locations of a service territory of a distributed service network given a specific outage scenario. Precise damage predictions in the context of a utility outage, for example, is inherently challenging in that damage forecasts are dependent on a variety of factors. Thus, it is difficult to provide or predict the precise outage scenario. By considering multiple possible outage scenarios and producing a resource positioning plan that best suits the multiple possible outage scenarios, improvements are provided.

In some embodiments, resource positioning considers planning during the progress of an event, rather than only forecasted outages. Techniques which consider only forecasted outages in the process or restoration work plan computation suffer from disadvantages. For example, restoration work plan computation during the progress of a disaster event (e.g., a storm, fire, earthquake, etc.) is not possible, as there exists realized outages as well. Resource position planning in some embodiments considers planning during the progress of the disaster event (e.g., in-storm, etc.). Frameworks described herein may partition demand from tasks into different buckets with different priorities, with the optimization model meeting demand from high priority buckets before meeting demand from low priority buckets. The demand from forecasted outages and realized outages (e.g., outages that have already occurred) is configured to be directed into different buckets of demand, and thus realized outages may be considered in resource position planning. Frameworks described herein thus allow tasks with high criticality to be attended respecting their shorter turnaround times, by keeping such tasks in high priority demand buckets.

Embodiments also provide advantages by considering resource deployment policies at different locations. Resource deployment policies may vary from one service organization (e.g., energy utility, water utility, etc.) to another. Embodiments may associate a resource organization with each resource type. For example, there may be internal, contractor and mutual-aid resources under each resource type (e.g., assessment, repair, etc.) of an energy utility. Distinguishing the resources by organization helps in reducing restoration cost (e.g., by preferring use of internal resources versus contractor or mutual-aid resources, etc.). Resource deployment policies are thus encapsulated as part of an outage restoration process. For example, contractor resources available locally at a division may be utilized before transferring internal resources available at a different division to a division with outstanding demand.

Some models schedule individual tasks as part of resource position planning. The computation of a task execution schedule for a huge number of possible tasks to be considered as part of resource position planning, however, may be excessively time consuming. Thus, real-time resource position planning may not be achievable with scheduling of individual tasks. Further, in practice it may be required to run a resource position planning method multiple times with different input tasks, resource availabilities, etc. before finalizing a specific resource position plan. Some embodiments provide for real-time resource position planning, with an optimization model that aggregates demand across tasks and does resource position planning instead of computing a task execution schedule consisting of a huge number of individual tasks.

Construction of a multi-commodity flow network will now be described. Optimization for resource position planning in some embodiments is done on a time-space network, where each node of a graph corresponds to a location during some designated time interval, referred to herein as a shift. Each node holds resources at a location $L_i$ during time duration (e.g., shift) $S_i$ defined by a start time sttime and an end time endtime. Resource capacities at nodes in shift $S_0$ represent initial resource capacities at each location. In the description below, it is assumed that the time durations of $S_0$, $S_1$, $S_2$, $S_3$, etc. each have a length of one shift, where each shift has a designated time duration (e.g., 8 hours, 16 hours, 1 day, 1 week, etc.). It is also possible to utilize different shift lengths for the different shifts $S_0$, $S_1$, $S_2$, $S_3$, etc. Each node may have new resources that are hired or deployed, or resources from previous shifts (from any location) moved to that node.

Edges in the multi-commodity flow network may be one of two types. Horizontal edges refer to the transfer of resources to the next shift at the same location. Horizontal edges have a transfer time or cost of 0. The other type of edge is cross edges, which refer to the transfer of resources from one location to some other location. There is at most one edge between a source node and possible destination nodes with the same location. Horizontal edges are forward edges, where the destination node is ahead of the source node in the time horizon. Cross edges may be "vertical" or "diagonal." Vertical cross edges connect nodes in the same shift, and represent transportation time less than the shift work length. Diagonal cross edges connect nodes in different shifts, and represent transportation time greater than the shift work length. If there is an edge from a source node to a destination node, there will be a non-zero time at the destination node left after the resource arrival at the destination via the edge from the source node. Resources start travel over the edge at the beginning of the shift from the source node.

Figure 5:
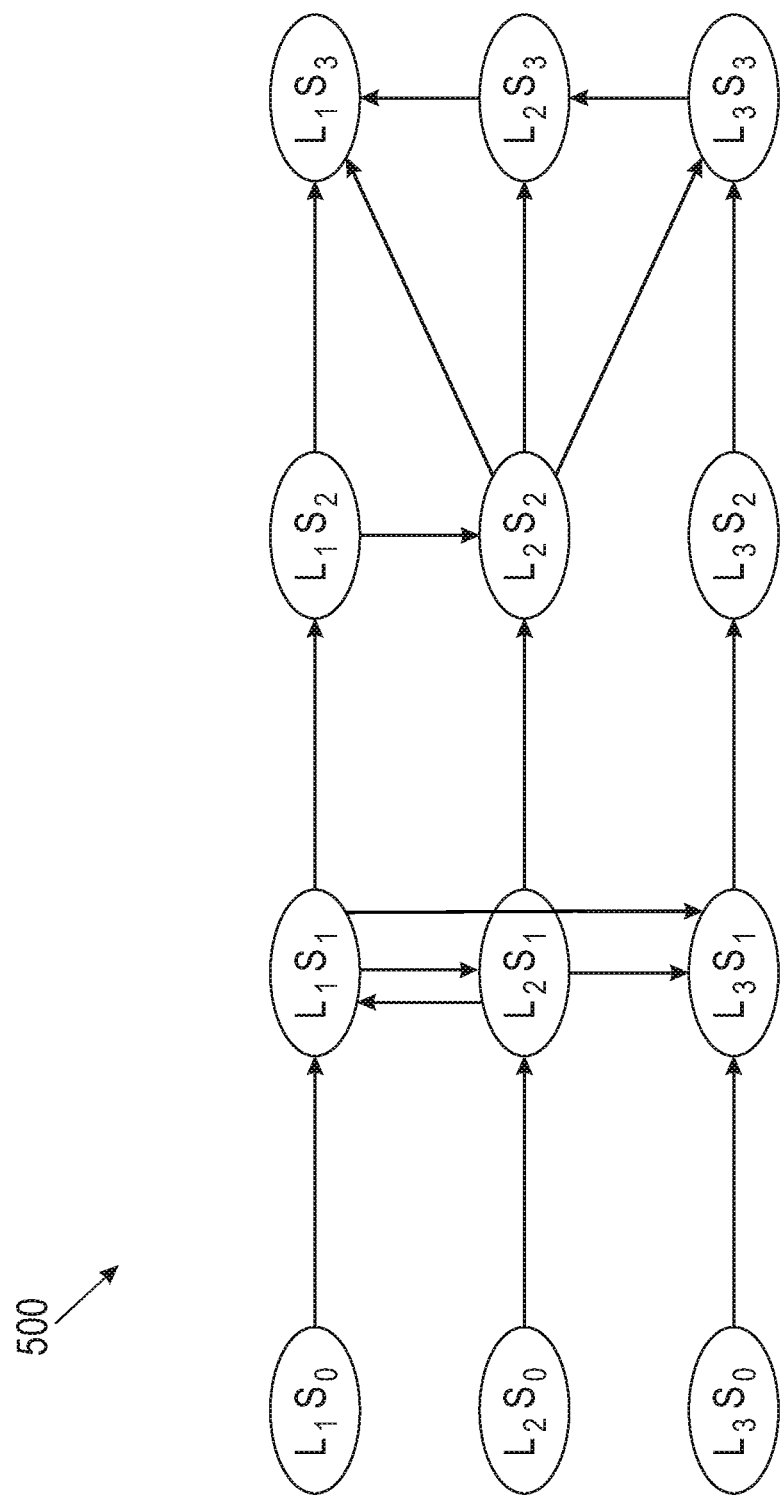
FIG. 5 depicts a multi-commodity flow network, according to an exemplary embodiment of the present invention.

FIG. 5 shows an example multi-commodity flow network 500, with three locations denoted $L_1$, $L_2$ and $L_3$, with a planning horizon of three shifts $S_1$, $S_2$ and $S_3$ including an initial resource allocation $S_0$. There are two types of network flows depicted in FIG. 5, a resource flow and a demand flow. The resource flow represents resources of different types moved between different nodes of the network. The demand flow represents demand at each node that belongs to the tasks arriving in a current shift to be met by the resources at that node. If there are not sufficient resources to complete the tasks in the current shift, the demand from a node gets added to the demand in the following shift at that same location.

Figure 6A:
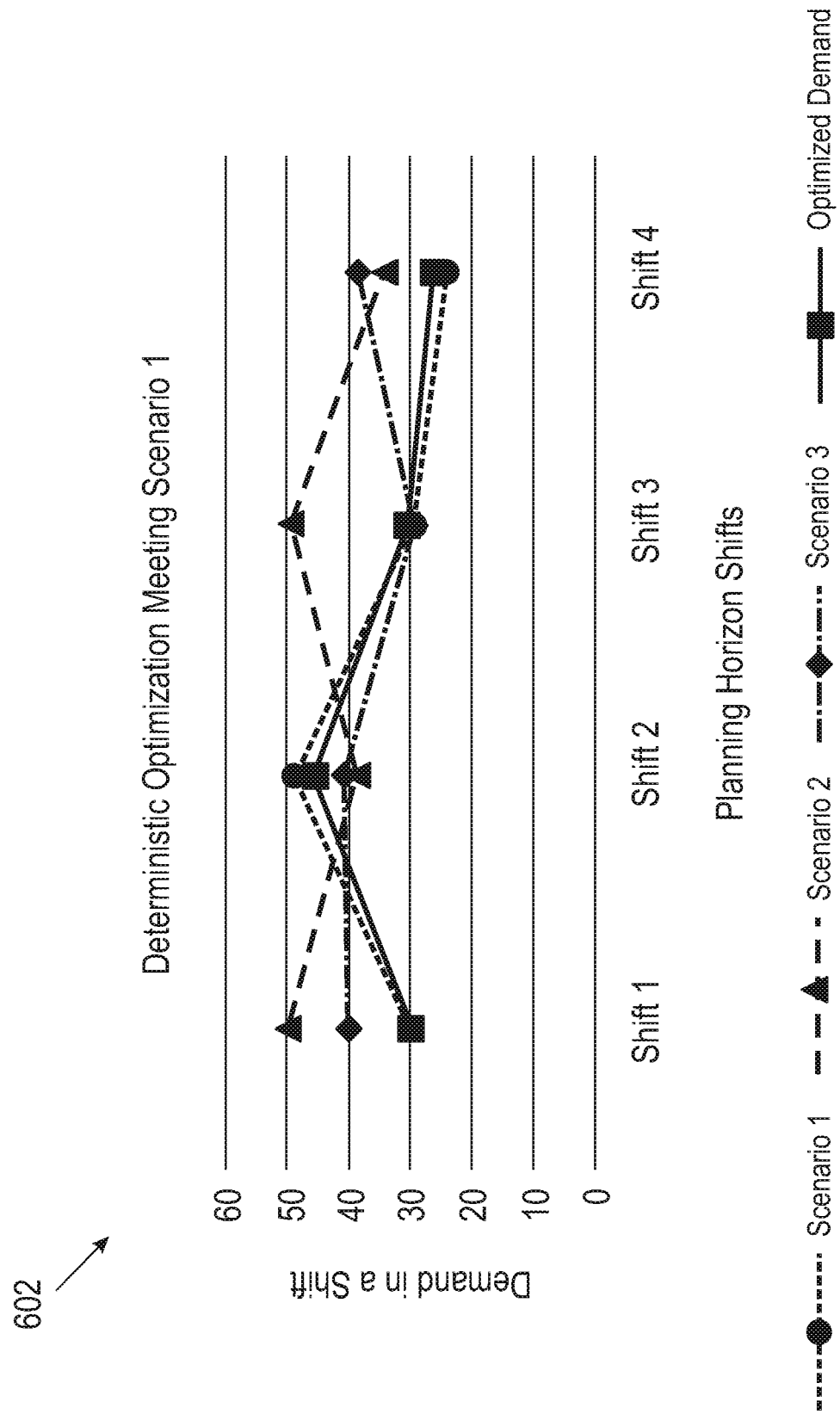

FIG. 6A depicts a plot 602 showing a deterministic optimization for a single scenario and FIG. 6B depicts another plot 604 showing a stochastic optimization for a set of three scenarios. Optimizations may be performed considering a set of possible outage scenarios, such as 3-5 possible outage scenarios, with their respective probabilities of occurrence. The plots 602 and 604 each illustrate three possible scenarios denoted Scenario 1, Scenario 2 and Scenario 3, along with an optimized demand. The plot 602 shows a deterministic optimization for Scenario 1, while the plot 604 shows a stochastic optimization for input Scenarios 1, 2 and 3. Assuming that Scenario 2 occurs in reality, then under the deterministic optimization it is very difficult to mitigate the demand requirement in shifts denoted Shift 1 and Shift 3 for Scenario 2. Under the stochastic optimization, it is possible to mitigate the demand requirements in Shift 1 and Shift 3 for Scenario 2.

An objective function may consider unmet demand from each scenario multiplied with the scenario occurrence probability. An example objective function is shown below:

$$dexpr \text{ float } sumUnmetDemand = \sum_{\substack{node \in nodes, \\ scnr \in scenarios, \\ tt \in taskTypes, \\ pr \text{ in Priorities}}} (unmetDemand_{node,pr}^{scnr}.tt * pr * scnr_{probability}).$$

The optimization model in some embodiments considers the following as input: the planning horizon; the locations of the service territory; current resource positioning at different locations; maximum possible resource capacities of different resource types in different shifts at different locations; organizational operational constraints; and tasks under different scenarios.

The optimization model may be implemented as a mixed integer linear programming model for resource scheduling, which works at the level of number of resources of each type available at any point in time rather than individual resource instances. For each resource type, a model variable captures a time series of the usage for that resource type at any point in time. A constraint ensures that this time series does not exceed the availability of that resource type at any time point. The optimization model in some embodiments also includes other operational constraints, such as the maximum number of continuous working hours for resources, maintaining at least minimum staffing requirements at any location at any time, travel times, appropriate matching of resource types to tasks, etc.

Inputs to the stochastic optimization or outputs from the stochastic optimization may be partitioned into two categories: scenario independent (e.g., resource centric data) and scenario specific (e.g., demand centric data, since the tasks in the scenarios are different). Resource specific constraints (e.g., operational constraints, capacity constraints, flow conservation constraints, etc.) are not scenario dependent. Demand related flow conservation constraints are scenario dependent. Since at any point in time in reality, out of the many possible scenarios, only one actually occurs, the optimization model needs to satisfy the demand constraints specified for each scenario separately.

The optimization model in some embodiments is used for resource position planning while an event occurs (e.g., in-storm or otherwise during an event). The optimization model can be used for resource position planning both before the start of, and during, the progress of an event (e.g., a natural disaster such as a storm, earthquake, etc.) Thus, outages can be realized outages or predicted outages. Both realized and predicted tasks may be associated with different priorities (e.g., low, medium, high). At a location in a given shift, if there are tasks with different priorities, it is generally recommended that higher priority tasks be serviced before low priority tasks are serviced. This, however, is not a requirement. In some embodiments, realized tasks are serviced before predicted tasks even if one or more of the predicted tasks have higher priority than one or more of the realized tasks. The optimization model allows the specific priority order for tasks from realized and predicted categories to be configurable. For example, the task priority order may be: high priority realized tasks, medium priority realized tasks, high priority predicted tasks, medium priority predicted tasks, low priority realized tasks, low priority predicted tasks, etc. As another example, the task priority order may be: high priority realized tasks, high priority predicted tasks, medium priority realized tasks, medium priority predicted tasks, low priority realized tasks, low priority predicted tasks, etc.

In some embodiments, locations may be dynamically "carved." The optimization model allows administrative locations of a service territory to be configured dynamically, and can compute resource positioning including newly added locations, given the outage distribution for dynamically carved locations is provided.

The optimization model may also be used to meet location specific ETOR constraints. The restoration of outages or other remediation at different locations may be planned using the optimization model to meet ETOR and/or service level agreements (SLAs) specific to the different locations. An example ETOR SLA for a specific location may be that 95% of the outages at that location are restored within 24 hours. The optimization model may set the met demand to 0 at each node beyond the location-specific ETOR time period as a constraint, thus implementing the ETORs specific to each location over the planning horizon.

Various resource deployment policies may be used in different embodiments. To deploy resources at different locations as per a resource positioning computed by the optimization model, the utility or other entity can locally deploy available resources, or resources may be transferred from other locations to a location where there is a need. The optimization model allows the user to specify the deployment order for the resources that belong to different organizations (e.g., internal resources, contractor resources, mutual aid resources, etc.). To deploy resources at a location, one possible ordering of resource acquisition that may be used is: internal local resources, internal resources from other locations, contractor local resources, contractor resources from other locations, mutual aid local resources, mutual aid resources from other locations, etc. It is to be appreciated, however, that this ordering is just one example, and that other orderings may be used as desired for a particular application.

The cost for acquiring a resource that belongs to a specific organization can be used in the objective function of an optimization model to impose a specific resource deployment policy as desired by a user. While the objective function aims at minimizing unmet demand at each node of a network flow graph, the balance between the objectives (e.g., minimizing the unmet demand and imposing a specific deployment policy by minimizing the cost for resource acquisition) could be easily achieved due to the following phenomenon. Irrespective of the resource acquisition cost, it is generally desired to meet as much demand as possible during emergencies. Thus, the unmet demand may be multiplied with a weight that is more than the acquisition cost for one resource under any policy.

In some embodiments, the optimization model produces resource position planning at different locations, but does not specify resource scheduling (e.g., the resource position plan or configuration does not necessarily include assignment of work orders or tasks to individual instances of the resources). The optimization model following the multi-commodity network flow formulation can be solved in real time (e.g., in a couple of minutes). Thus, it is possible to rerun the optimization model multiple times with varying inputs and decide on a final resource deployment plan or resource positioning configuration that is best or most feasible for an organization.

Figure 7:
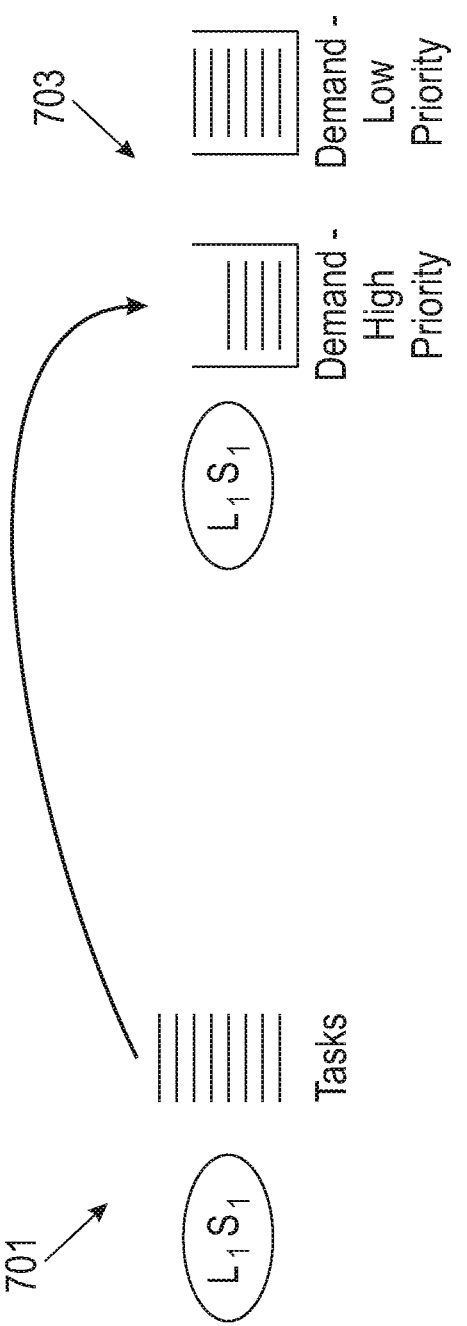
FIG. 7 depicts demand aggregation and restoration prioritization processing, according to an exemplary embodiment of the present invention.

FIG. 7 illustrates demand aggregation and restoration prioritization processing. Demand aggregation is shown in element 701, where tasks of a given type are aggregated at each node in the distributed service network to determine the demand at that node over the multi-commodity flow network. Restoration prioritization processing is shown in element 703, where the demand at each node is partitioned. In the FIG. 7 example, the demand at location $L_1$ in shift $S_1$ is partitioned into two buckets of demand with different priorities—a high priority demand bucket and a low priority demand bucket.

Figure 8:
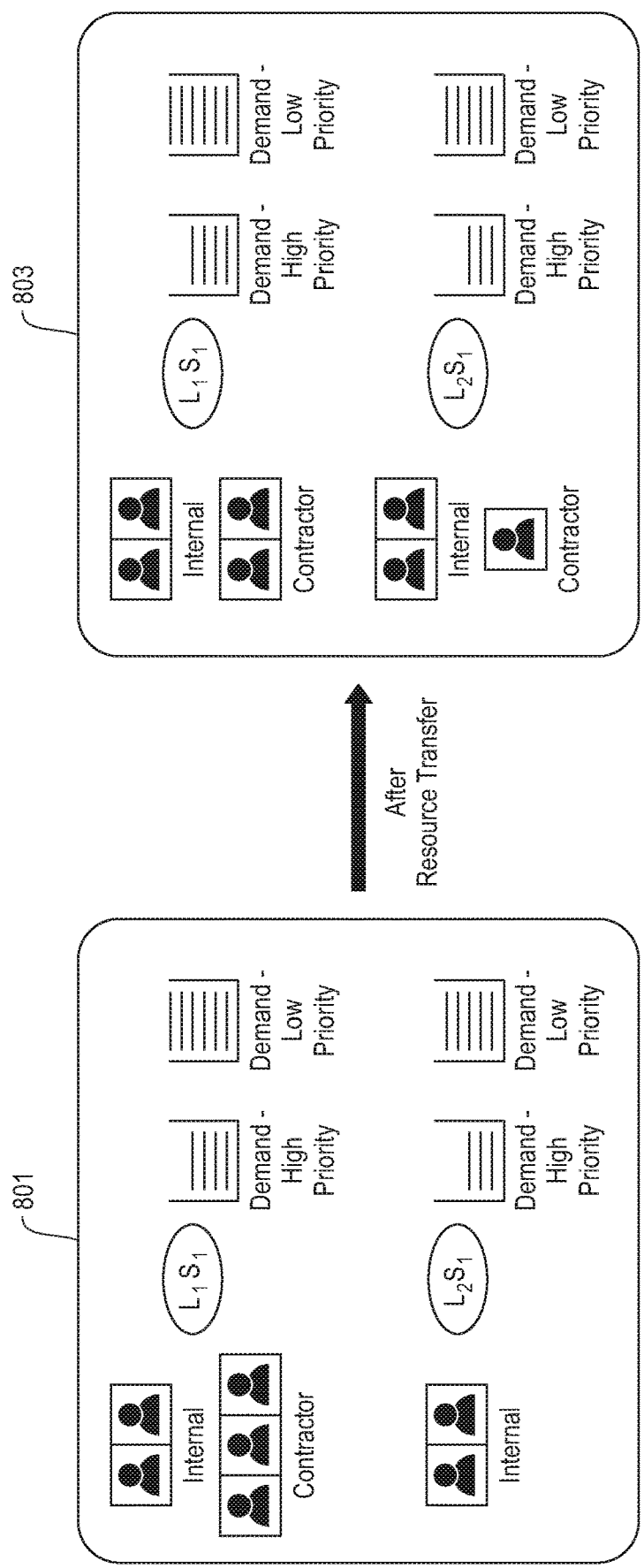
FIG. 8 depicts resource positioning and resource deployment policy processing, according to an exemplary embodiment of the present invention.

FIG. 8 illustrates resource positioning and resource deployment policy processing. Resource position processing involves positioning resources at nodes to meet the demand at the nodes, with resources being transferred between nodes to meet demand as necessary. Resource deployment policy processing involves respecting resource deployment priorities during resource transfer between locations. FIG. 8 shows resource positioning at locations $L_1$ and $L_2$ for shift $S_1$ both before 801 and after 803 resource transfer. Before resource transfer, the location $L_1$ in shift $S_1$ has two units of internal resources and three units of contractor resources, with location $L_2$ in shift $S_1$ having two units of internal resources. The demand at locations $L_1$ and $L_2$ in shift $S_1$ are each aggregated into two demand buckets (e.g., high priority and low priority demand buckets). To better meet demand at location $L_2$ in shift $S_1$, one unit of contractor resource is transferred from location $L_1$ to location $L_2$ as illustrated in FIG. 8.

Figure 9:
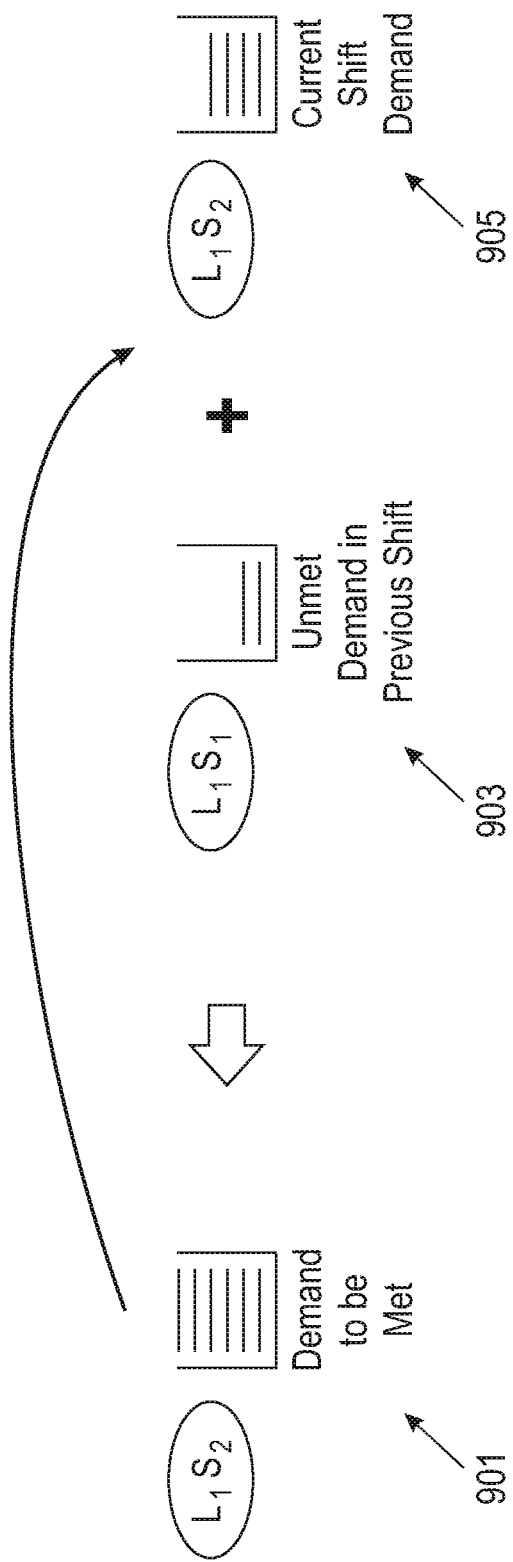
FIG. 9 depicts a demand flow in a multi-commodity network, according to an exemplary embodiment of the present invention.

FIG. 9 illustrates demand flow of the multi-commodity network, where the met demand at a node is less than or equal to the demand in the current shift at that location plus the unmet demand from the previous shift at the same location. In FIG. 9, the demand 901 to be met at location $L_1$ for shift $S_2$ is the sum of the unmet demand 903 in the previous shift $S_1$ at location $L_1$ and the current shift demand 905 for shift $S_2$ at location $L_1$.

Figure 10:
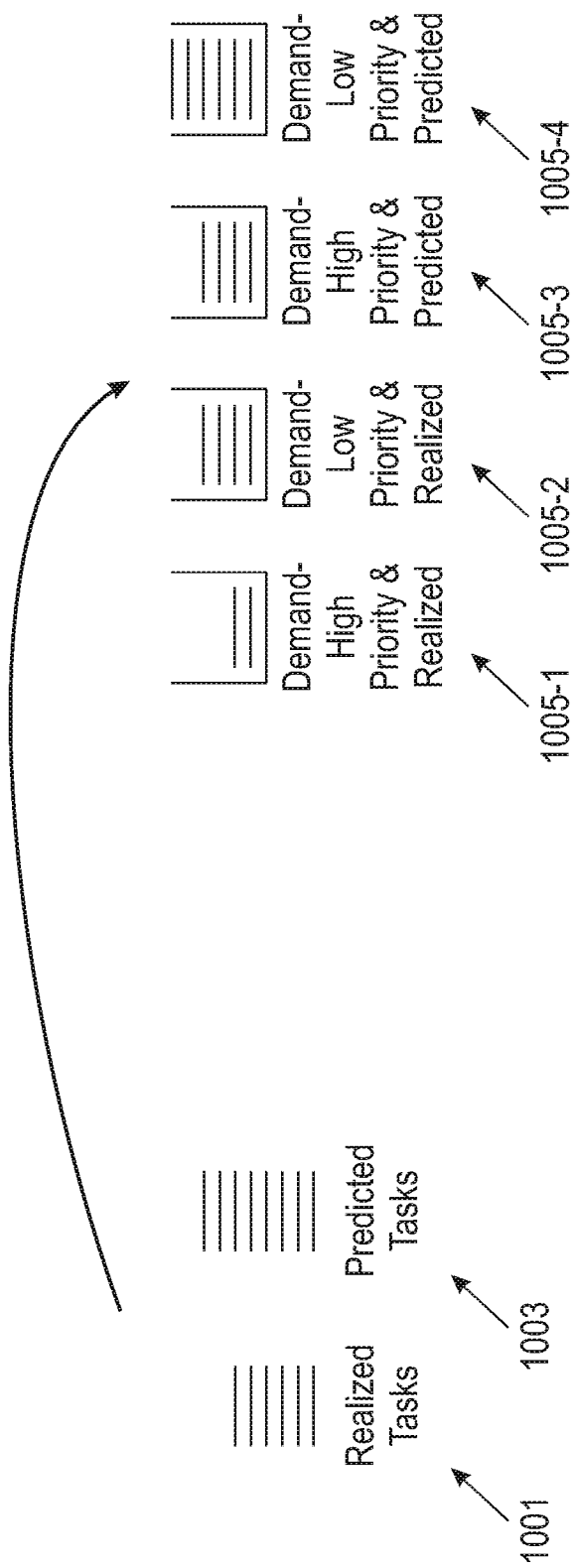
FIG. 10 depicts an ordering of demand buckets, according to an exemplary embodiment of the present invention.
Figure 11:
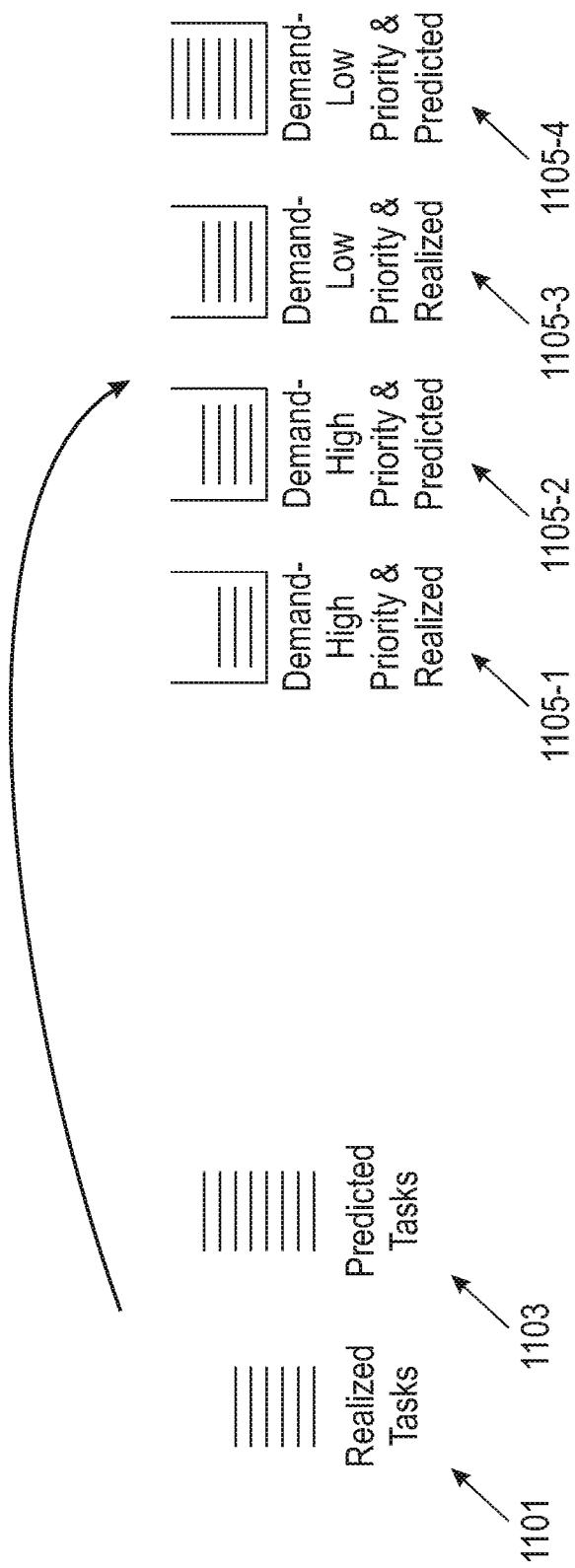
FIG. 11 depicts another ordering of demand buckets, according to an exemplary embodiment of the present invention.

As discussed above, restoration order may be determined by prioritization of different buckets of demand. Buckets of demand may be associated with differing priorities (e.g., low, medium, high). In addition, buckets of demand may be associated with realized tasks at a node or predicted tasks at a node. The order of resolving the different buckets of demand is configurable. FIGS. 10 and 11 illustrate two possible ordering of demand buckets. FIG. 10 shows realized tasks 1001 and predicted tasks 1003, which are partitioned into demand buckets ordered as follows: (i) a high priority and realized tasks demand bucket 1005-1; (ii) a low priority and realized tasks demand bucket 1005-2; (iii) a high priority and predicted tasks demand bucket 1005-3; and (iv) a low priority and predicted tasks demand bucket 1005-4. FIG. 11 shows realized tasks 1101 and predicted tasks 1103, which are partitioned into demand buckets ordered as follows: (i) a high priority and realized tasks demand bucket 1105-1; (ii) a high priority and predicted tasks demand bucket 1105-2; (iii) a low priority and realized tasks demand bucket 1105-3; and (iv) a low priority and predicted tasks demand bucket 1105-4. It is to be appreciated, however, that the particular orderings of demand buckets illustrated in FIGS. 10 and 11 are present by way of example, and that embodiments are not limited to the particular orderings illustrated in FIGS. 10 and 11. Other embodiments may use additional or alternative partitioning of demand as desired for a particular application.

Figure 12:
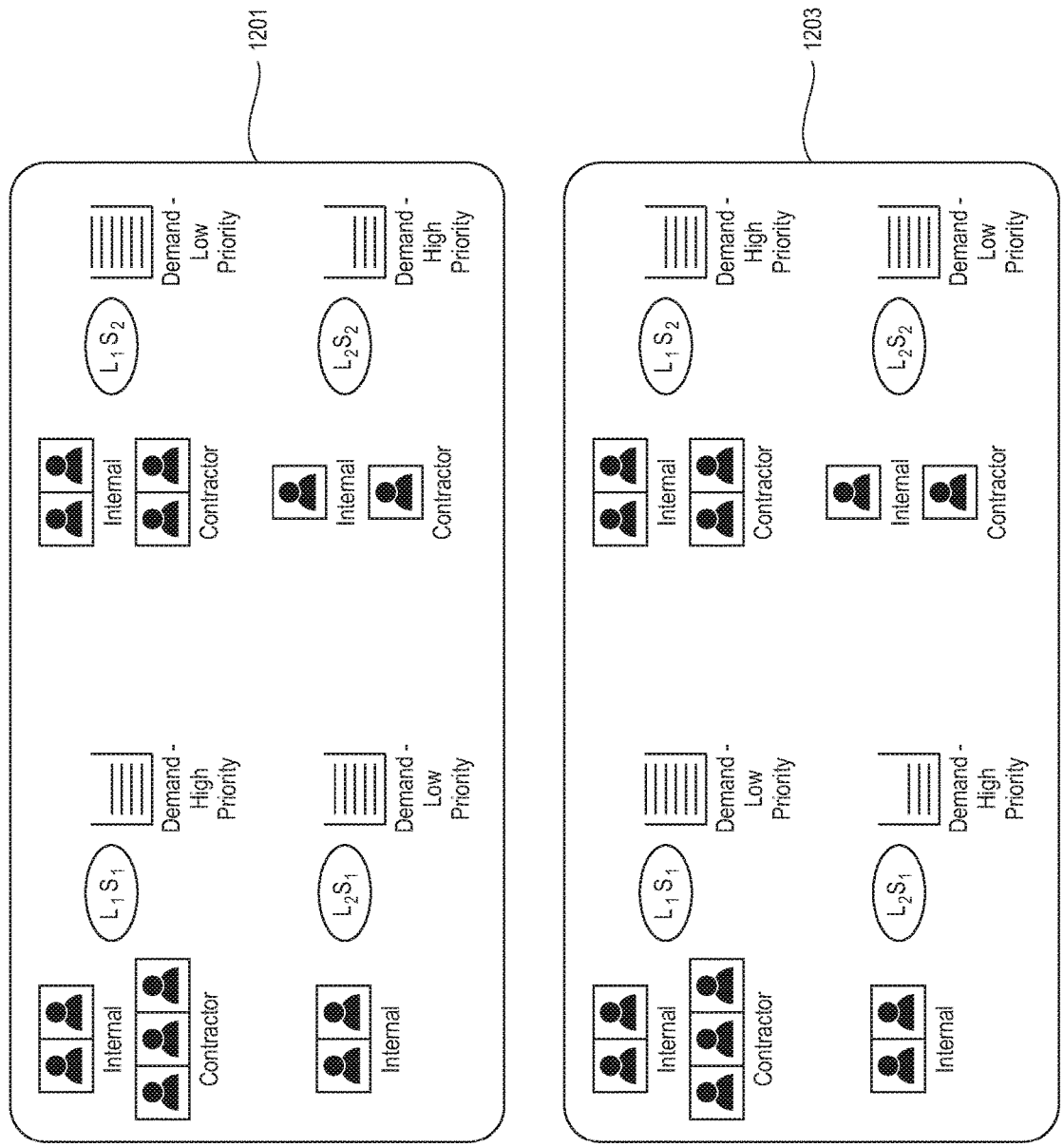
FIG. 12 depicts stochastic optimization for resource positioning, according to an exemplary embodiment of the present invention.

FIG. 12 depicts stochastic optimization for resource positioning, where the resource positioning at different nodes is aimed at meeting any one of a set of possible stochastic outage scenarios, but is not limited to meet just a single possible deterministic outage scenario. FIG. 12 shows a first possible stochastic outage scenario 1201 and a second possible stochastic outage scenario 1203. The resource positioning is the same for both outage scenarios 1201 and 1203, although the outage scenarios 1201 and 1203 are different. For example, in outage scenario 1201 the location $L_1$ in shift $S_1$ has high priority demand and the location $L_2$ in shift $S_1$ has low priority demand, while in outage scenario 1203 the location $L_1$ in shift $S_1$ has low priority demand and the location $L_2$ in shift $S_1$ has high priority demand. The demands for shift $S_2$ at locations $L_1$ and $L_2$ also differ between outage scenarios 1201 and 1203. The stochastic optimization, however, determines a resource positioning that meets both possible scenarios 1201 and 1203 without necessarily being an optimal resource positioning for an individual one of the scenarios 1201 and 1203.

In some embodiments, tasks of a same type (e.g., assessment, repair, replace, etc.) with the same priority at a given location are aggregated, and the resources positioned at a given node meet the cumulative demand at that node. The met demand at a node cannot exceed the sum of the unmet demand from the previous node (at the same location) and the current demand at that node. Unmet demand that belongs to a high priority demand bucket may be multiplied with a weight (e.g., a relatively high number) in the minimization objective function of the optimization formulation so that the resource positioning computed by an optimization model meets high priority demand before meeting lower priority demand.

As discussed above, demand that belongs to realized tasks can be partitioned into different demand buckets with different priorities at a node, and similarly, demand that belongs to predicted tasks can be partitioned into different demand buckets with different priorities at the node. The restoration order among the different buckets or pools of demand can be defined in accordance with various policies (e.g., user-specified policies, location-specific policies, etc.).

The demand flow respects flow conservation constraints over the network (e.g., met demand and unmet demand definitions at each node), and is specific to each outage scenario. Resource flow respects resource operations constraints, and is not specific to any outage scenario. Resource deployment priorities for resources of a same type may differ based on the resource organization to which resources belong. Such resource deployment priorities are respected by associating different costs for local deployment of resources with different organizations, and their corresponding transfer across nodes. A low cost is associated with more desired resource deployment options over less desired options.

An objective function of the optimization model is a minimization over the unmet demand cost and the resource deployment cost. The optimization model, in some embodiments, ensures that not meeting one unit of demand is more costly than the resource deployment cost for meeting one unit of demand under any resource deployment policy. The optimization model computes resource positioning in some embodiments by minimizing unmet demand across different scenarios, and following resource deployment policies.

Various embodiments are described herein primarily with responding to or remediating service outages, such as service outages associated with a utility, due to some event. In some cases, tasks are associated with responding to or remediating service outages of a utility distribution network (e.g., an energy utility, a water utility, etc.) due to some event such as a natural disaster (e.g., a storm, earthquake, fire, etc.) or other disruption of service. In such cases, the resources may represent assessment and repair crews, equipment, etc. needed to respond to or remediate the service outages. In other cases, tasks may be associated with responding to or remediating service outages of another type of distributed service network (e.g., a telecommunication network, a distributed computing system, etc.) in response to some event (e.g., a natural disaster, infection with a virus or other disruption due to malware, widespread equipment failure, recalls, etc.). In such cases, the resources may represent maintenance and repair staff, equipment, etc. needed to respond to or remediate the service outages. Various other use cases are possible. More generally, tasks may be associated with service outages of any geographically distributed service network due to some event such as a natural disaster, and the resources may be maintenance and repair staff, equipment, etc. responsible for restoration of the outages.

In some embodiments, the outages input to the optimization model belong to a single scenario, and the associated probability of occurrence of that scenario is 100%. The proposed stochastic optimization model output in such cases is equivalent to a deterministic optimization meeting demand under the single input scenario. Outages that are input may be predicted outages or realized outages. The priority assigned to the outages may by the same or different, and the specific policy of assigning priority to outages may be configurable. Resource deployment policies may also be different for different locations of a service territory.

Some embodiments may be implemented as an application in the IBM® ILOG® Decision Optimization Center (DOC) platform. The optimization model may be implemented as a mixed integer linear programming (MILP) model. The optimization model may be developed in the Optimization Programming Language (OPL) modeling language. The ILOG® CPLEX® Optimizer may be used to solve the optimization model. Embodiments may more generally be implemented on any of a wide variety of modeling systems such as an Advanced Interactive Multi-dimensional Modeling System (AIMMS), A Mathematical Programming Language (AMPL), etc. as a MILP model (or as a constraint programming (CP) model, etc.), and can be solved using an appropriate solver.

Figure 13:
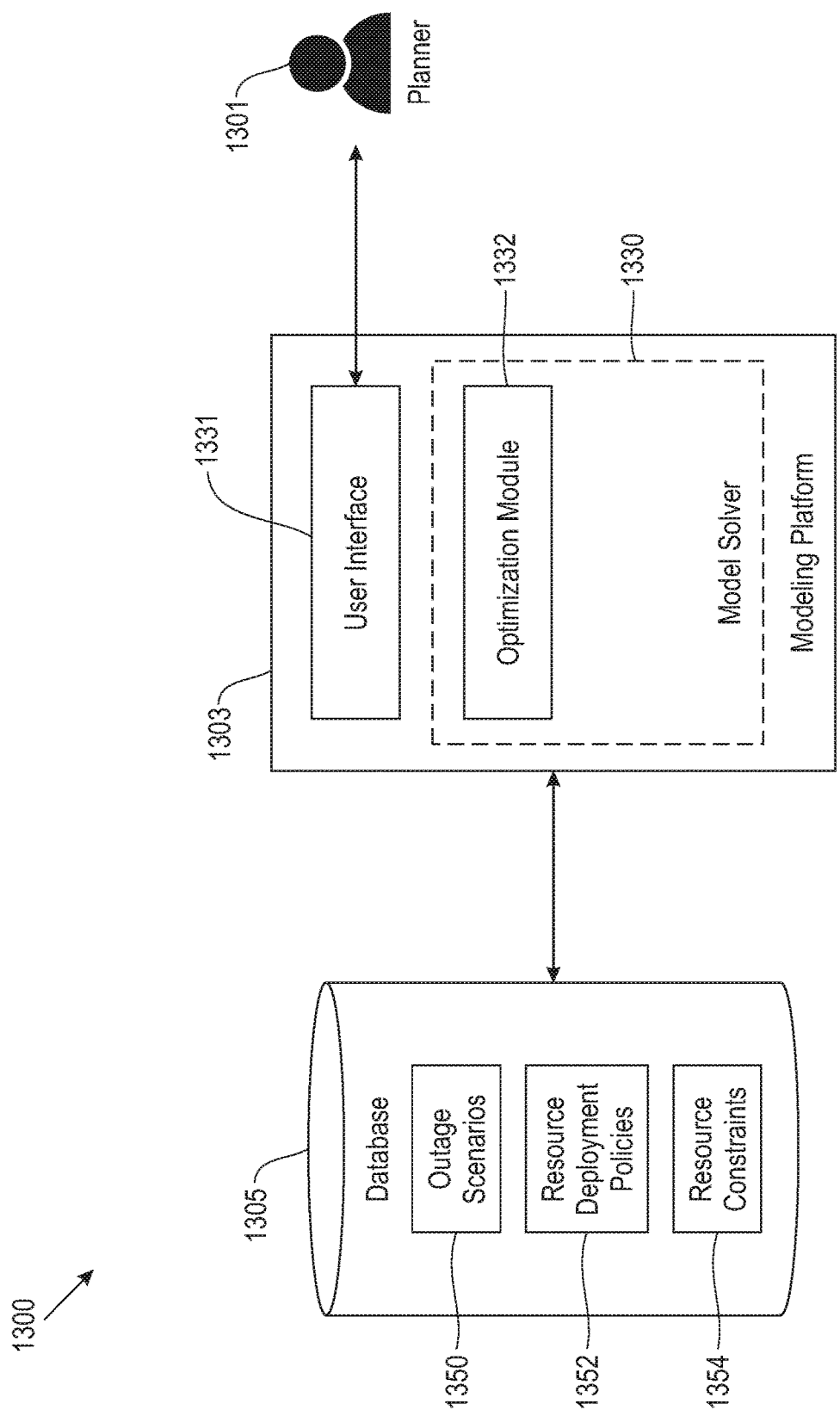
FIG. 13 depicts a resource position planning system, according to an exemplary embodiment of the present invention.

FIG. 13 shows a resource position planning system 1300. A planner or other user 1301 is configured to interact with a modeling platform 1303 of the resource position planning system 1300 via a user interface 1331. The planner 1301 may provide various input for use by a model solver 1330 of the modeling platform 1303, with the model solver 1330 being configured to solve an optimization model 1332 configured as described herein. The input from the planner 1301 may include information relating to resource constraints or policies, resource deployment constraints or policies, demand bucket ordering, outage scenarios, etc. The optimization model 1332 uses this information, as well as other information obtained from a database 1305 such as outage scenarios 1350, resource deployment policies 1352, resource constraints 1354, etc., to generate resource positioning configurations optimized for a set of possible outage scenarios as described herein.

Figure 14:
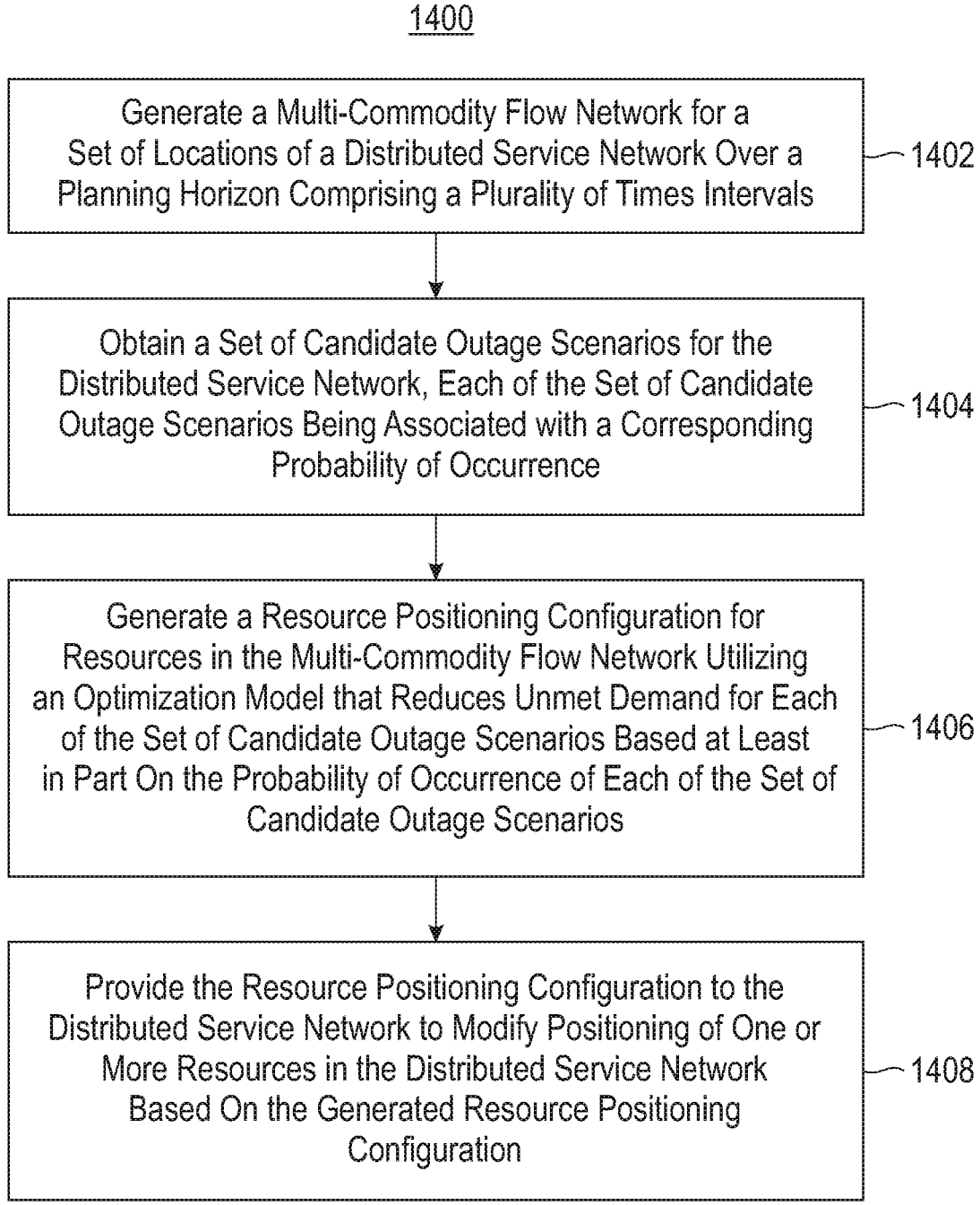
FIG. 14 depicts a process for generating resource positioning configurations, according to an exemplary embodiment of the present invention.

FIG. 14 depicts a process flow 1400 for generating resource positioning configurations. The process flow begins with step 1402, generating a multi-commodity flow network for a set of locations of a distributed service network over a planning horizon comprising a plurality of time intervals. Each node in the multi-commodity flow network represents a location of the distributed service network at a given one of the time intervals, and each node is associated with a set of resources available at a corresponding location for a corresponding time interval.

Horizontal edges connecting nodes in the multi-commodity flow network represent transfer of one or more resources at the same location from a previous time interval to a subsequent time interval, and cross edges in the multi-commodity flow network connecting a first node representing a first location in the distributed service network to a second node representing a second location in the distributed service network represent transfer of one or more resources from the first location to the second location. Cross edges in the multi-commodity flow network connecting the first node to the second node in a given time interval represent transfer of resources with transportation time less than a length of the given time interval, and cross edges in the multi-commodity flow network connecting the first node associated with a previous time interval to the second node associated with a subsequent time interval represent transfer of resources with transportation time greater than the length of the previous time interval. The multi-commodity flow network may further comprise edges connecting the nodes representing demand flow, where unmet demand at a given node associated with a previous time interval is added to demand at the given node in a subsequent time interval.

The process flow 1400 continues with step 1404, obtaining a set of candidate outage scenarios for the distributed service network, each of the set of candidate outage scenarios being associated with a corresponding probability of occurrence. In step 1406, a resource positioning configuration for resources in the multi-commodity flow network is generated utilizing an optimization model that reduces unmet demand for each of the set of candidate outage scenarios based at least in part on the probability of occurrence of each of the set of candidate outage scenarios. Step 1406 may further include determining a current resource positioning at the locations of the distributed service network, and providing the current resource positioning as an input to the optimization model. The optimization model may be configured to dynamically partition the distributed service network into the set of locations. Thus, in some cases, the set of locations may vary over the planning horizon.

The optimization model may comprise a MILP model for resource scheduling in the multi-commodity flow network. In some embodiments, the optimization model comprises resource type model variables and a resource type constraint, the resource type model variables capturing time series of usage for each of the resource types at a given point in time and the resource type constraint ensuring that the time series of usage for a given resource type does not exceed availability of that resource type at any time point. The optimization model may comprise one or more operational constraints such as: resource time constraints specifying a maximum number of continuous working hours for each resource type; resource allocation constraints specifying at least a minimum number of resources to be staffed at any location at any point in time; resource travel time constraints specifying travel time for each resource type; and resource matching constraints specifying matching of resource types to different tasks.

In some embodiments, at least one of the set of candidate outage scenarios comprises one or more realized outages in the distributed service network and one or more predicted outages in the distributed service network, and the optimization model comprises one or more dynamically configurable restoration prioritization constraints specifying an ordering of different priority tasks associated with the one or more realized outages and the one or more predicted outages. The optimization model may comprise ETOR constraints associated with each location in the set of locations, and the optimization model may set the met demand to zero at each node beyond the location-specific ETOR for that location.

In some embodiments, the optimization model comprises one or more resource deployment ordering policies, the one or more resource deployment ordering policies specifying a deployment order for resources belonging to different organizations. The optimization model may utilize an objective function that minimizes unmet demand at each node of the multi-commodity flow network subject to the one or more resource deployment policies, by associating an acquisition cost with the resources belonging to the different organizations based on the one or more resource deployment ordering policies. The objective function multiplies unmet demand at a node in the multi-commodity flow network with a weight more than the acquisition cost for a given resource under the one or more resource deployment ordering policies.

The process flow 1400 concludes with step 1408, providing the resource positioning configuration to the distributed service network to modify positioning of one or more resources in the distributed service network based on the generated resource positioning configuration. Step 1408 may involve providing the resource positioning configuration to one or more devices in, or associated with, the distributed service network that are responsible for or have the ability to configure resource positioning within the distributed service network. Such devices may be associated with users such as a planner, an IT administrator, etc.

Figure 15:
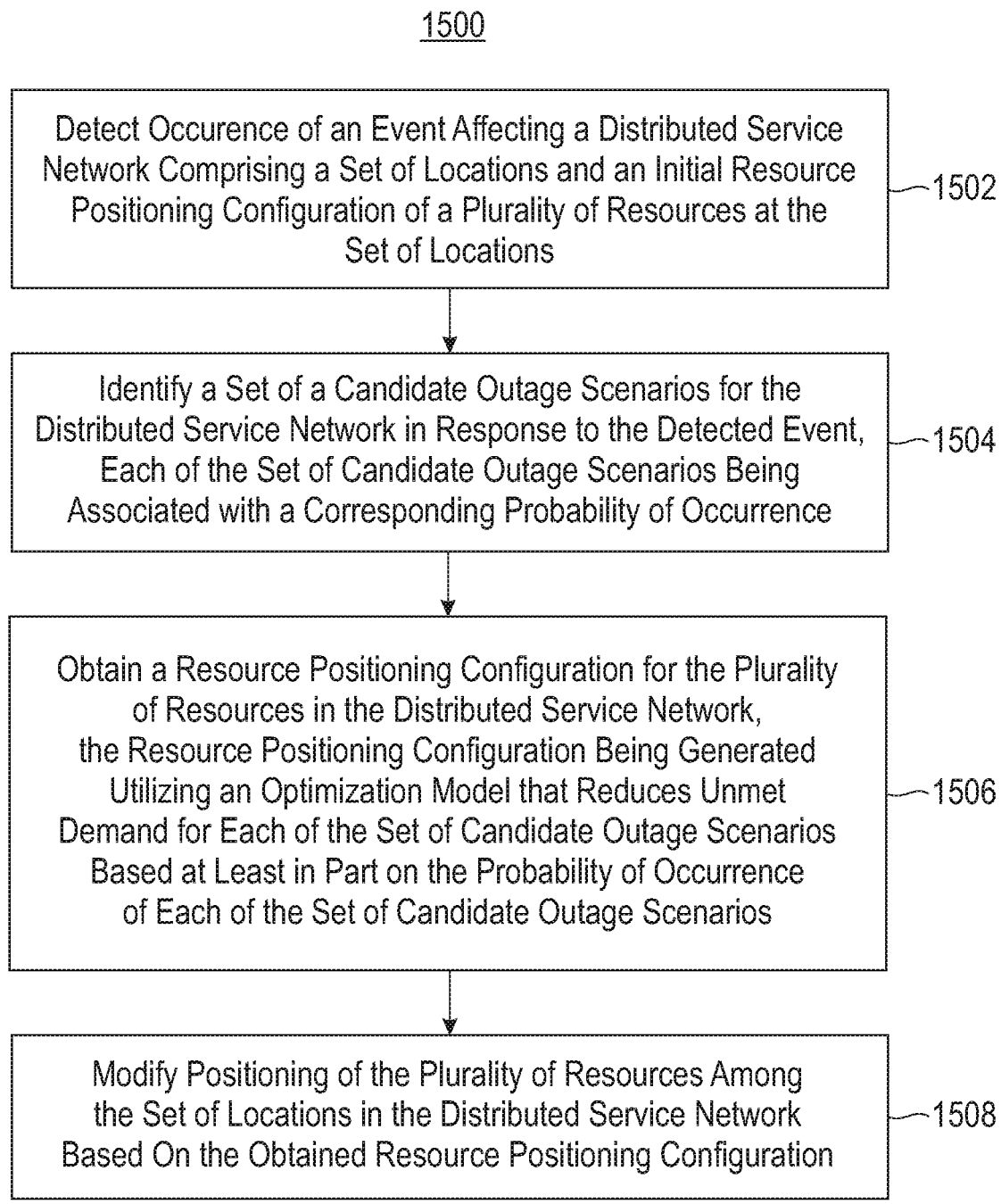
FIG. 15 depicts another process for modifying resource positioning in a distributed service network, according to an exemplary embodiment of the present invention.

FIG. 15 depicts a process flow 1500 for modifying resource positioning in a distributed service network. The process flow 1500 begins with step 1502, detecting occurrence of an event affecting a distributed service network comprising a set of locations and an initial resource positioning configuration of a plurality of resources at the set of locations. The distributed service network may comprise a utility, a telecommunications network, a distributed computing infrastructure, or other distributed service networks including combinations of the above. The detected event may comprise a natural disaster or other event which causes or is expected to cause outages or other disruption of service in at least a portion of the distributed service network.

In step 1504, a set of candidate outage scenarios for the distributed service network are identified in response to the detected event, with each of the set of candidate outage scenarios being associated with a corresponding probability of occurrence. In step 1506, a resource positioning configuration for the plurality of resources in the distributed service network is obtained. The resource positioning configuration is generated utilizing an optimization model that reduces unmet demand for each of the set of candidate outage scenarios based at least in part on the probability of occurrence of each of the set of candidate outage scenarios.

The process flow 1500 concludes with step 1508, modifying positioning of the plurality of resources among the set of locations in the distributed service network based on the obtained resource positioning configuration. Step 1508 may include moving at least one of the plurality of resources from a first location in the distributed service network to a second location in the distributed service network during a given one of a plurality of time intervals of a planning horizon of the obtained resource positioning configuration.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16:
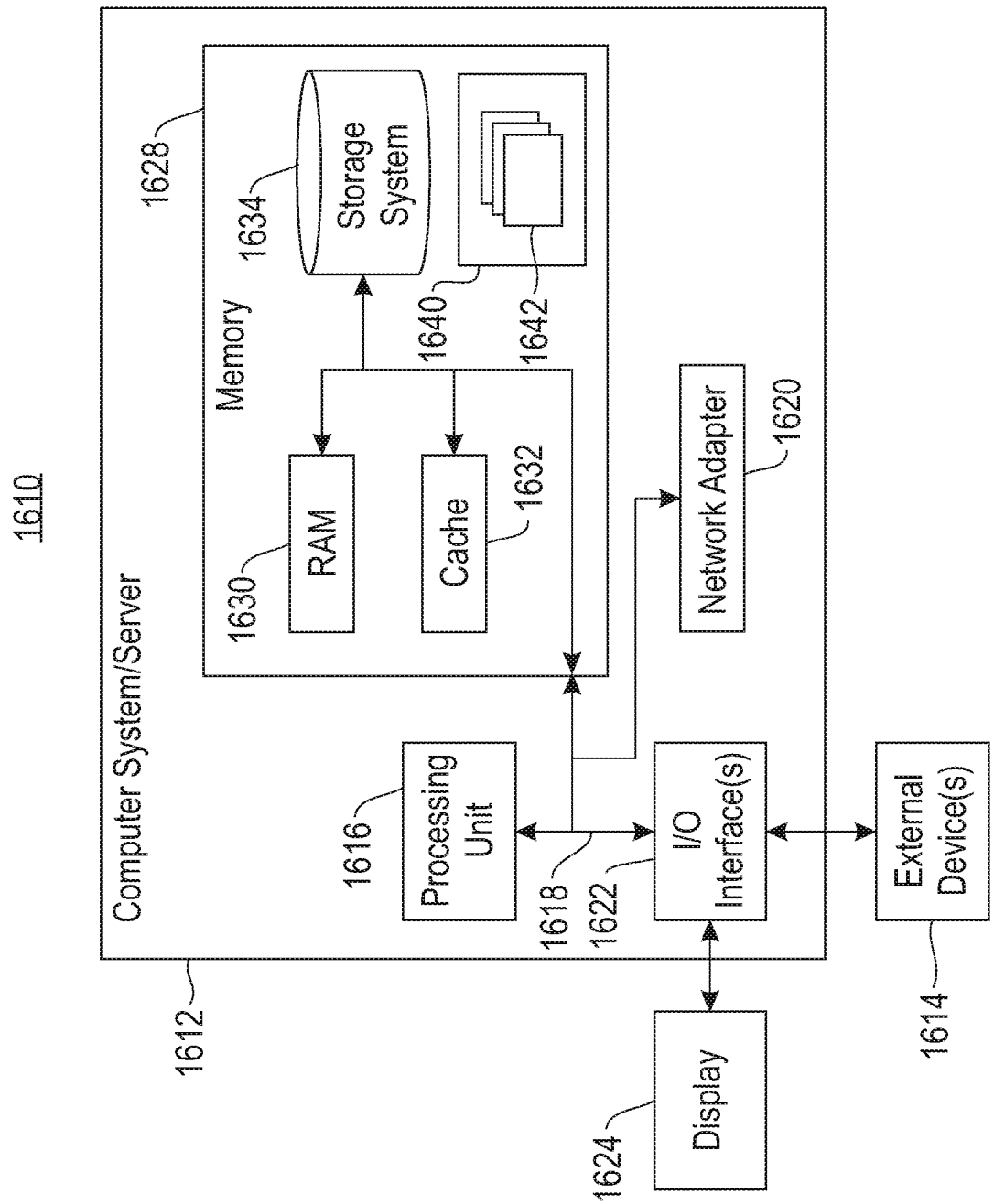
FIG. 16 depicts a computer system in accordance with which one or more components/steps of techniques of the invention may be implemented, according to an exemplary embodiment of the invention.

One or more embodiments can make use of software running on a general-purpose computer or workstation. With reference to FIG. 16, in a computing node 1610 there is a computer system/server 1612, which is operational with numerous other general purpose or special purpose computing system environments or configurations. Examples of well-known computing systems, environments, and/or configurations that may be suitable for use with computer system/server 1612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 1612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 1612 in computing node 1610 is shown in the form of a general-purpose computing device. The components of computer system/server 1612 may include, but are not limited to, one or more processors or processing units 1616, a system memory 1628, and a bus 1618 that couples various system components including system memory 1628 to processor 1616.

The bus 1618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1612 typically includes a variety of computer system readable media. Such media may be any available media that is accessible by computer system/server 1612, and it includes both volatile and non-volatile media, removable and non-removable media.

The system memory 1628 can include computer system readable media in the form of volatile memory, such as random access memory (RAM) 1630 and/or cache memory 1632. The computer system/server 1612 may further include other removable/non-removable, volatile/nonvolatile computer system storage media. By way of example only, storage system 1634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1618 by one or more data media interfaces. As depicted and described herein, the memory 1628 may include at least one program product having a set (e.g., at least one) of program modules that are configured to carry out the functions of embodiments of the invention. A program/utility 1640, having a set (at least one) of program modules 1642, may be stored in memory 1628 by way of example, and not limitation, as well as an operating system, one or more application programs, other program modules, and program data. Each of the operating system, one or more application programs, other program modules, and program data or some combination thereof, may include an implementation of a networking environment. Program modules 1642 generally carry out the functions and/or methodologies of embodiments of the invention as described herein.

Computer system/server 1612 may also communicate with one or more external devices 1614 such as a keyboard, a pointing device, a display 1624, etc., one or more devices that enable a user to interact with computer system/server 1612, and/or any devices (e.g., network card, modem, etc.) that enable computer system/server 1612 to communicate with one or more other computing devices. Such communication can occur via I/O interfaces 1622. Still yet, computer system/server 1612 can communicate with one or more networks such as a LAN, a general WAN, and/or a public network (e.g., the Internet) via network adapter 1620. As depicted, network adapter 1620 communicates with the other components of computer system/server 1612 via bus 1618. It should be understood that although not shown, other hardware and/or software components could be used in conjunction with computer system/server 1612. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 17:
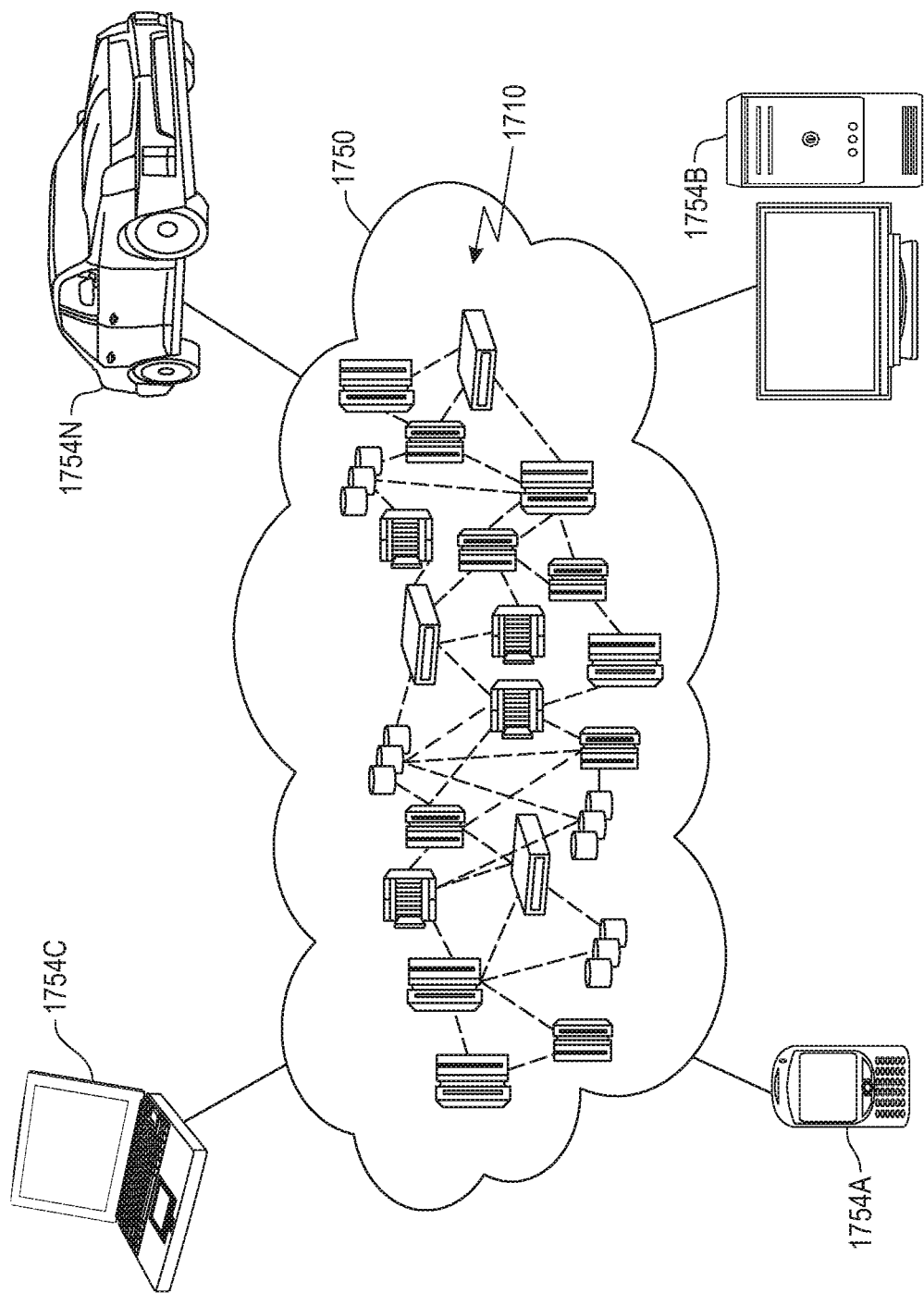
FIG. 17 depicts a cloud computing environment, according to an exemplary embodiment of the present invention.

Referring now to FIG. 17, illustrative cloud computing environment 1750 is depicted. As shown, cloud computing environment 1750 includes one or more cloud computing nodes 1710 with which local computing devices used by cloud consumers, such as, for example, personal digital assistant (PDA) or cellular telephone 1754A, desktop computer 1754B, laptop computer 1754C, and/or automobile computer system 1754N may communicate. Nodes 1710 may communicate with one another. They may be grouped (not shown) physically or virtually, in one or more networks, such as Private, Community, Public, or Hybrid clouds as described hereinabove, or a combination thereof. This allows cloud computing environment 1750 to offer infrastructure, platforms and/or software as services for which a cloud consumer does not need to maintain resources on a local computing device. It is understood that the types of computing devices 1754A-N shown in FIG. 17 are intended to be illustrative only and that computing nodes 1710 and cloud computing environment 1750 can communicate with any type of computerized device over any type of network and/or network addressable connection (e.g., using a web browser).

Figure 18:
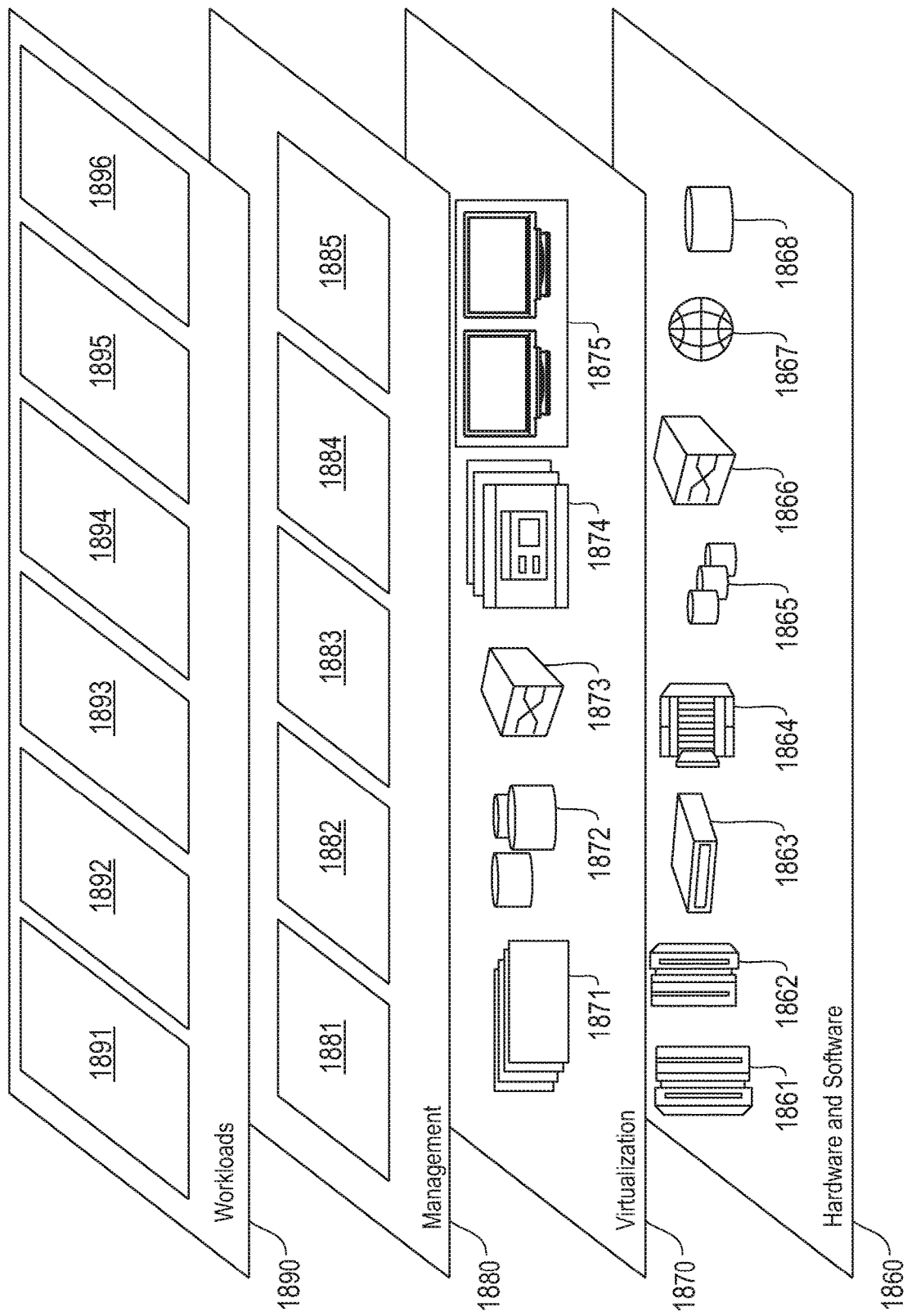
FIG. 18 depicts abstraction model layers, according to an exemplary embodiment of the present invention.

Referring now to FIG. 18, a set of functional abstraction layers provided by cloud computing environment 1750 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 1860 includes hardware and software components. Examples of hardware components include: mainframes 1861; RISC (Reduced Instruction Set Computer) architecture based servers 1862; servers 1863; blade servers 1864; storage devices 1865; and networks and networking components 1866. In some embodiments, software components include network application server software 1867 and database software 1868.

Virtualization layer 1870 provides an abstraction layer from which the following examples of virtual entities may be provided: virtual servers 1871; virtual storage 1872; virtual networks 1873, including virtual private networks; virtual applications and operating systems 1874; and virtual clients 1875.

In one example, management layer 1880 may provide the functions described below. Resource provisioning 1881 provides dynamic procurement of computing resources and other resources that are utilized to perform tasks within the cloud computing environment. Metering and Pricing 1882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1883 provides access to the cloud computing environment for consumers and system administrators. Service level management 1884 provides cloud computing resource allocation and management such that required service levels are met. Service Level Agreement (SLA) planning and fulfillment 1885 provide pre-arrangement for, and procurement of, cloud computing resources for which a future requirement is anticipated in accordance with an SLA.

Workloads layer 1890 provides examples of functionality for which the cloud computing environment may be utilized. Examples of workloads and functions which may be provided from this layer include: mapping and navigation 1891; software development and lifecycle management 1892; virtual classroom education delivery 1893; data analytics processing 1894; transaction processing 1895; and resource position processing 1896, which may perform various functions described above with respect to resource positioning techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
generating a multi-commodity flow network graph for a set of locations of a distributed service network over a planning horizon comprising one or more time intervals, wherein the multi-commodity flow network graph comprises:
(i) a plurality of nodes, wherein each node represents a given one of the locations and is associated with a set of resources available at the given one of the locations for a given one of the time intervals, wherein the set of available resources corresponding to at least a portion of the set of locations correspond to different organizations;
(ii) a set of horizontal edges, each horizontal edge representing transfer of at least a portion of the set of resources from a previous time interval to a subsequent time interval between nodes representing the same location,
(iii) a set of cross edges, each cross edge representing transfer of at least a portion of the set of resources between nodes representing different locations; and (iv) a set of additional edges representing demand flow between nodes;

obtaining a set of candidate outage scenarios for the distributed service network, each candidate outage scenarios in the set being associated with a corresponding probability of occurrence, wherein at least one of the candidate outage scenarios in the set comprises (i) one or more realized outages in the distributed service network and (ii) one or more predicted outages in the distributed service network;

generating a resource positioning configuration for resources in the multi-commodity flow network graph by utilizing an optimization model that reduces unmet demand for each of the set of candidate outage scenarios, based at least in part on the probability of occurrence of each of the set of candidate outage scenarios, wherein the optimization model comprises: (i) one or more dynamically configurable restoration prioritization constraints specifying an ordering of different priority tasks associated with both the one or more realized outages and the one or more predicted outages, and (ii) a plurality of resource deployment ordering policies, the plurality of deployment ordering policies specifying deployment orders for resources belonging to different organizations, and wherein the optimization model utilizes an objective function that minimizes unmet demand at each node of the multi-commodity flow network graph, subject to the one or more resource deployment policies, by associating an acquisition cost with the resources belonging to the different organizations based on the one or more resource deployment ordering policies, and wherein the objective function multiplies unmet demand at a node in the multi-commodity flow network graph with a weight more than the acquisition cost for a given resource under the one or more resource deployment ordering policies; and providing the resource positioning configuration to the distributed service network to modify positioning of one or more resources in the distributed service network, said positioning based on the generated resource positioning configuration;

wherein the steps are carried out by at least one computing device.

2. The method of claim 1, wherein a given one of the cross edges in the multi-commodity flow network graph connects (i) a first node representing a first location in the distributed service network to (ii) a second node representing a second location in the distributed service network, wherein the first node and the second node correspond to a same time interval, and wherein the transfer of at least the portion of the set of resources corresponding to the given cross edge has a transportation time less than a length of the possible work in said same time interval.

3. The method of claim 1, wherein a given one of the cross edges in the multi-commodity flow network graph connects (i) a first node representing a first location in the distributed service network to (ii) a second node representing a second location in the distributed service network, the first node is associated with a previous time interval and the second node is associated with a subsequent time interval, and wherein the transfer of at least the portion of the set of resources corresponding to the given cross edge has a transportation time greater than the length of the possible work in that previous time interval.

4. The method of claim 1, wherein unmet demand at a given node associated with a previous time interval is added to demand at the given node in a subsequent time interval.

5. The method of claim 1, wherein the optimization model comprises a mixed integer linear programming model for resource scheduling in the multi-commodity flow network.

6. The method of claim 1, wherein the optimization model comprises resource type model variables and a resource type constraint, the resource type model variables capturing time series of usage for each of the resource types at a given point in time, and the resource type constraint ensuring that the time series of usage for a given resource type does not exceed availability of that resource type at any time point.

7. The method of claim 1, wherein the optimization model comprises one or more operational constraints, the one or more operational constraints comprising:
resource time constraints specifying a maximum number of continuous working hours for each resource type;
resource allocation constraints specifying at least a minimum number of resources to be staffed at any location at any point in time;
resource travel time constraints specifying travel time for each resource type; and
resource matching constraints specifying matching of resource types to different tasks.

8. The method of claim 1, comprising determining a current resource positioning at the locations of the distributed service network, and providing the current resource positioning as an input to the optimization model.

9. The method of claim 1, wherein the optimization model is configured to dynamically partition the distributed service network into the plurality of locations.

10. The method of claim 1, wherein the optimization model comprises estimated time of restoration (ETOR) constraints associated with each location in the set of locations, and wherein the optimization model sets met demand to zero at each node beyond the location-specific ETOR for that location.

11. A computer program product, the computer program product comprising a non-transitory computer readable storage medium having program instructions embodied therewith, the program instructions executable by at least one computing device to cause the at least one computing device to perform steps of:
generating a multi-commodity flow network graph for a set of locations of a distributed service network over a planning horizon comprising one or more time intervals, wherein the multi-commodity flow network graph comprises:
(i) a plurality of nodes, wherein each node represents a given one of the locations and is associated with a set of resources available at the given one of the locations for a given one of the time intervals, wherein the set of available resources corresponding to at least a portion of the set of locations correspond to different organizations;
(ii) a set of horizontal edges, each horizontal edge representing transfer of at least a portion of the set of resources from a previous time interval to a subsequent time interval between nodes representing the same location,
(iii) a set of cross edges, each cross edge representing transfer of at least a portion of the set of resources between nodes representing different locations; and
(iv) a set of additional edges representing demand flow between nodes;

obtaining a set of candidate outage scenarios for the distributed service network, each candidate outage scenarios in the set being associated with a corresponding probability of occurrence, wherein at least one of the candidate outage scenarios in the set comprises (i) one or more realized outages in the distributed service network and (ii) one or more predicted outages in the distributed service network;

generating a resource positioning configuration for resources in the multi-commodity flow network graph by utilizing an optimization model that reduces unmet demand for each of the set of candidate outage scenarios based at least in part on the probability of occurrence of each of the set of candidate outage scenarios, wherein the optimization model comprises: (i) one or more dynamically configurable restoration prioritization constraints specifying an ordering of different priority tasks associated with both the one or more realized outages and the one or more predicted outages, and (ii) a plurality of resource deployment ordering policies, the plurality of deployment ordering policies specifying deployment orders for resources belonging to different organizations, and wherein the optimization model utilizes an objective function that minimizes unmet demand at each node of the multi-commodity flow network graph, subject to the one or more resource deployment policies, by associating an acquisition cost with the resources belonging to the different organizations based on the one or more resource deployment ordering policies, and wherein the objective function multiplies unmet demand at a node in the multi-commodity flow network graph with a weight more than the acquisition cost for a given resource under the one or more resource deployment ordering policies; and providing the resource positioning configuration to the distributed service network to modify positioning of one or more resources in the distributed service network based on the generated resource positioning configuration.

12. A system comprising:

a memory; and at least one processor coupled to the memory and configured for:

generating a multi-commodity flow network graph for a set of locations of a distributed service network over a planning horizon comprising one or more time intervals wherein the multi-commodity flow network graph comprises:

(i) a plurality of nodes, wherein each node represents a given one of the locations and is associated with a set of resources available at the given one of the locations for a given one of the time intervals, wherein the set of available resources corresponding to at least a portion of the set of locations correspond to different organizations;

(ii) a set of horizontal edges, each horizontal edge representing transfer of at least a portion of the set of resources from a previous time interval to a subsequent time interval between nodes representing the same location, (iii) a set of cross edges, each cross edge representing transfer of at least a portion of the set of resources between nodes representing different locations; and (iv) a set of additional edges representing demand flow between nodes;

obtaining a set of candidate outage scenarios for the distributed service network, each candidate outage scenarios in the set being associated with a corresponding probability of occurrence, wherein at least one of the candidate outage scenarios in the set comprises (i) one or more realized outages in the distributed service network and (ii) one or more predicted outages in the distributed service network;

generating a resource positioning configuration for resources in the multi-commodity flow network graph by utilizing an optimization model that reduces unmet demand for each of the set of candidate outage scenarios based at least in part on the probability of occurrence of each of the set of candidate outage scenarios, wherein the optimization model comprises: (i) one or more dynamically configurable restoration prioritization constraints specifying an ordering of different priority tasks associated with both the one or more realized outages and the one or more predicted outages, and (ii) a plurality of resource deployment ordering policies, the plurality of deployment ordering policies specifying deployment orders for resources belonging to different organizations, and wherein the optimization model utilizes an objective function that minimizes unmet demand at each node of the multi-commodity flow network graph, subject to the one or more resource deployment policies, by associating an acquisition cost with the resources belonging to the different organizations based on the one or more resource deployment ordering policies, and wherein the objective function multiplies unmet demand at a node in the multi-commodity flow network graph with a weight more than the acquisition cost for a given resource under the one or more resource deployment ordering policies; and providing the resource positioning configuration to the distributed service network to modify positioning of one or more resources in the distributed service network based on the generated resource positioning configuration.

13. A computer-implemented method, comprising steps of:

detecting occurrence of an event affecting a distributed service network comprising a set of locations and an initial resource positioning configuration of a plurality of resources at the set of locations;

identifying a set of a candidate outage scenarios for the distributed service network in response to the detected event, each of the set of candidate outage scenarios being associated with a corresponding probability of occurrence, wherein at least one of the set of candidate outage scenarios comprises (i) one or more realized outages in the distributed service network and (ii) one or more predicted outages in the distributed service network;

obtaining a resource positioning configuration for the plurality of resources in the distributed service network, the resource positioning configuration being generated utilizing an optimization model that reduces unmet demand for each of the set of candidate outage scenarios based at least in part on the probability of occurrence of each of the set of candidate outage scenarios, wherein the optimization model comprises: (i) one or more dynamically configurable restoration prioritization constraints specifying an ordering of different priority tasks associated with both the one or more realized outages and the one or more predicted outages and (ii) a plurality of resource deployment ordering policies, the plurality of deployment ordering policies specifying deployment orders for resources belonging to different organizations, and wherein the optimization model utilizes an objective function that minimizes unmet demand corresponding to the locations in the set, subject to the one or more resource deployment policies, by associating an acquisition cost with the resources belonging to the different organizations based on the one or more resource deployment ordering policies, and wherein the objective function multiplies unmet demand at each location in the set with a weight more than the acquisition cost for a given resource under the one or more resource deployment ordering policies; and modifying positioning of the plurality of resources among the set of locations in the distributed service network based on the obtained resource positioning configuration;

wherein the steps are carried out by at least one computing device.

14. The method of claim 13, wherein the distributed service network comprises at least one of a utility, a telecommunications network and a distributed computing infrastructure.

15. The method of claim 13, wherein the detected event comprises a natural disaster.

16. The method of claim 13, wherein modifying the positioning of the plurality of resources among the set of locations in the distributed service network comprises moving at least one of the plurality of resources from a first location in the distributed service network to a second location in the distributed service network during a given one of a plurality of time intervals of a planning horizon of the obtained resource positioning configuration.

17. The computer program product of claim 11, wherein a given one of the cross edges in the multi-commodity flow network graph connects (i) a first node representing a first location in the distributed service network to (ii) a second node representing a second location in the distributed service network, wherein the first node and the second node correspond to a same time interval, and wherein the transfer of at least the portion of the set of resources corresponding to the given cross edge has a transportation time less than a length of the possible work in said same time interval.

18. The computer program product of claim 11, wherein a given one of the cross edges in the multi-commodity flow network graph connects (i) a first node representing a first location in the distributed service network to (ii) a second node representing a second location in the distributed service network, wherein the first node is associated with a previous time interval and the second node is associated with a subsequent time interval, and wherein the transfer of at least the portion of the set of resources corresponding to the given cross edge has a transportation time greater than the length of the possible work in that previous time interval.

19. The computer program product of claim 11, wherein unmet demand at a given node associated with a previous time interval is added to demand at the given node in a subsequent time interval.

20. The computer program product of claim 11, wherein the optimization model comprises a mixed integer linear programming model for resource scheduling in the multi-commodity flow network graph.

* * * * *